(12) United States Patent
Lim

(10) Patent No.: US 12,422,378 B2
(45) Date of Patent: Sep. 23, 2025

(54) SUBSTRATE DEFECT ANALYSIS

(71) Applicant: APPLIED MATERIALS, INC., Santa Clara, CA (US)

(72) Inventor: Seng Keong Lim, Fremont, CA (US)

(73) Assignee: Applied Materials, Inc., Santa Clara, CA (US)

( * ) Notice: Subject to any disclaimer, the term of this patent is extended or adjusted under 35 U.S.C. 154(b) by 280 days.

(21) Appl. No.: 18/072,171

(22) Filed: Nov. 30, 2022

(65) Prior Publication Data

US 2024/0175824 A1 May 30, 2024

(51) Int. Cl.
*G01N 21/95* (2006.01)
*G01N 21/88* (2006.01)

(52) U.S. Cl.
CPC . *G01N 21/9501* (2013.01); *G01N 2021/8861* (2013.01); *G01N 2021/8883* (2013.01)

(58) Field of Classification Search
CPC ... G01N 2021/8861; G01N 2021/8883; G01N 21/9501; G01N 21/8851; G01N 23/2251; G06T 2207/20081; G06T 2207/30148; G06T 7/0008; G06T 7/0004; G06T 7/001; G06T 2207/10061; G06T 7/0002; G06T 2207/10056; G06N 20/00; G06V 10/764; G06V 2201/06
USPC ...................................................... 356/237.5
See application file for complete search history.

(56) References Cited

U.S. PATENT DOCUMENTS

| | | | |
|---|---|---|---|
| 6,744,266 B2 | 6/2004 | Dor et al. | |
| 2009/0201494 A1* | 8/2009 | Furman | G01N 21/9501 356/237.5 |
| 2014/0282334 A1* | 9/2014 | Hu | G01N 21/8803 716/112 |
| 2016/0123898 A1* | 5/2016 | Chen | H01J 37/28 356/237.5 |
| 2016/0328837 A1 | 11/2016 | He et al. | |
| 2019/0073566 A1 | 3/2019 | Brauer | |
| 2019/0214285 A1 | 7/2019 | Pandev et al. | |
| 2020/0226420 A1 | 7/2020 | Shaubi et al. | |

FOREIGN PATENT DOCUMENTS

CN 113610155 A 11/2021

OTHER PUBLICATIONS

International Search Report and Written Opinion for International Application No. PCT/US2023/081229, mailed Apr. 2, 2024, 09 Pages.

* cited by examiner

*Primary Examiner* — Sunghee Y Gray
(74) *Attorney, Agent, or Firm* — Lowenstein Sandler LLP

(57) ABSTRACT

A method includes identifying property data of a substrate processed by a substrate processing system. The method further includes identifying, based on a first subset of the property data, a plurality of regions of the substrate corresponding to a first defect category. The method further includes sub-categorizing, based on a second subset of the property data, the plurality of regions of the substrate corresponding to the first defect category into a plurality of defect sub-categories. The method further includes causing, based on one or more of the plurality of regions corresponding to at least one of the plurality of defect sub-categories, performance of a corrective action associated with the substrate processing system.

20 Claims, 9 Drawing Sheets

SUBSTRATE DEFECT ANALYSIS

TECHNICAL FIELD

The present disclosure relates to defect analysis, and, more particularly, substrate (e.g., wafer) defect analysis and root cause analysis.

BACKGROUND

Manufacturing equipment is used to produce products (e.g., substrates). For example, semiconductor substrate processing equipment is used to produce semiconductor substrates (e.g., semiconductor substrates with integrated circuits).

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a method includes identifying property data of a substrate processed by a substrate processing system. The method further includes identifying, based on a first subset of the property data, a plurality of regions of the substrate corresponding to a first defect category. The method further includes sub-categorizing, based on a second subset of the property data, the plurality of regions of the substrate corresponding to the first defect category into a plurality of defect sub-categories. The method further includes causing, based on one or more of the plurality of regions corresponding to at least one of the plurality of defect sub-categories, performance of a corrective action associated with the substrate processing system.

In another aspect of the disclosure, a non-transitory computer-readable storage medium stores instructions which, when executed, cause a processing device to perform operations. The operations include identifying property data of a substrate processed by a substrate processing system. The operations further include identifying, based on a first subset of the property data, a plurality of regions of the substrate corresponding to a first defect category. The operations further include sub-categorizing, based on a second subset of the property data, the plurality of regions of the substrate corresponding to the first defect category into a plurality of defect sub-categories. The operations further include causing, based on one or more of the plurality of regions corresponding to at least one of the plurality of defect sub-categories, performance of a corrective action associated with the substrate processing system.

In another aspect of the disclosure, a system includes a memory and a processing device coupled to the memory. The processing device is to identify property data of a substrate processed by a substrate processing system. The processing device is further to identify, based on a first subset of the property data, a plurality of regions of the substrate corresponding to a first defect category. The processing device is further to sub-categorize, based on a second subset of the property data, the plurality of regions of the substrate corresponding to the first defect category into a plurality of defect sub-categories. The processing device is further to cause, based on one or more of the plurality of regions corresponding to at least one of the plurality of defect sub-categories, performance of a corrective action associated with the substrate processing system.

BRIEF DESCRIPTION OF THE DRAWINGS

The present disclosure is illustrated by way of example, and not by way of limitation in the figures of the accompanying drawings.

DETAILED DESCRIPTION

Figure 1:
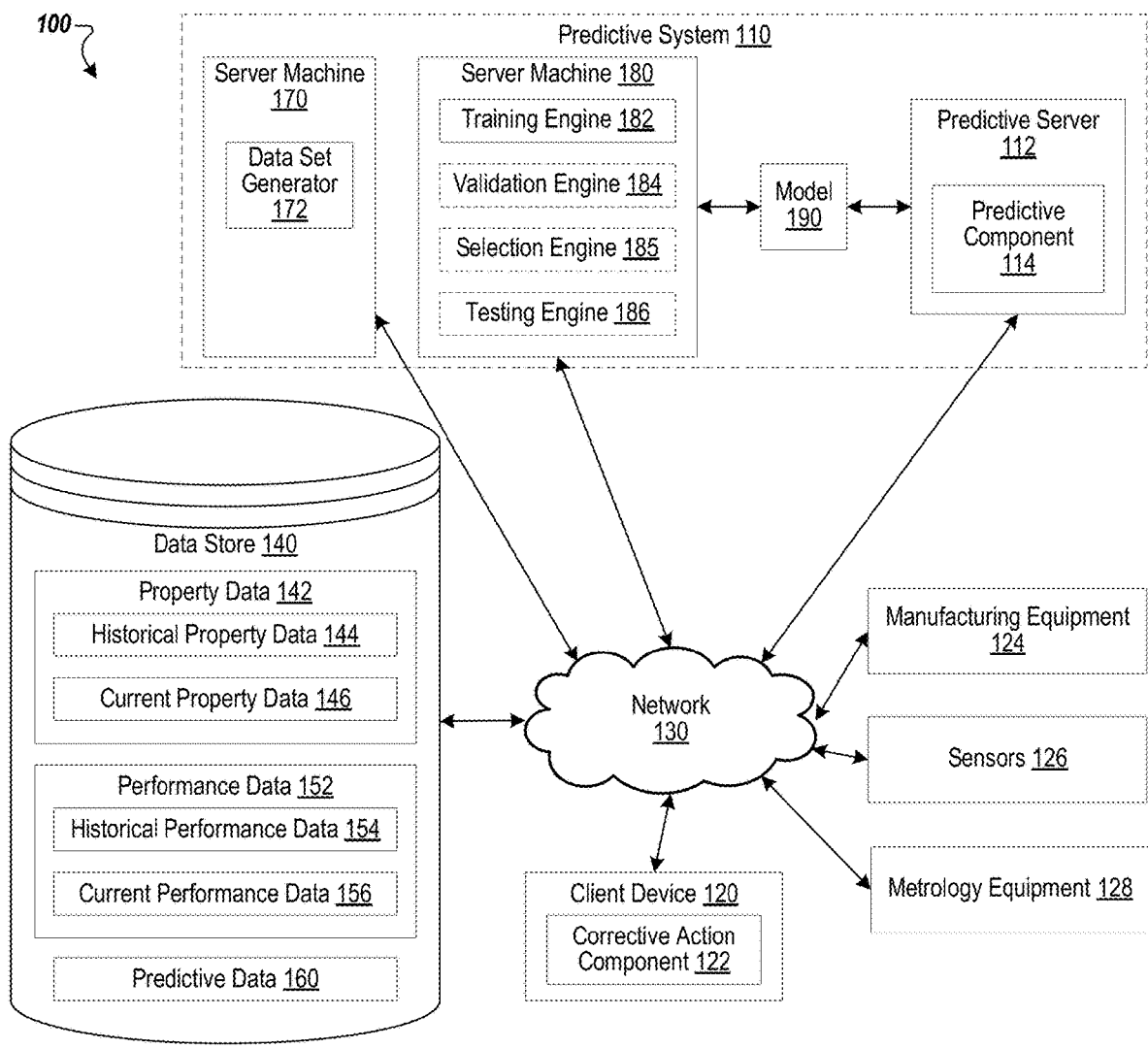
FIG. 1 is a block diagram illustrating an exemplary system architecture, according to certain embodiments.

Described herein are technologies directed to substrate defect analysis (e.g., defect source tracing and defect root cause identification and/or corrective action recommendation).

Manufacturing N equipment uses manufacturing parameters to produce products. For example, substrate processing equipment uses manufacturing parameters (e.g., temperature, pressure, etc.) during substrate processing operations (e.g., layer deposition, etching, etc.) to produce substrates. As a result of one or more of the operations, a substrate (e.g., finished substrate, partially processed substrate) may have abnormalities (e.g., defects). Substrates that have abnormalities may have performance data that does not meet thresholds values (e.g., are bad wafers). This results in discarded substrates, poorly performing substrates, lower yield, wasted material and energy, and so forth.

Conventionally, actual substrates or test substrates are processed by substrate processing equipment and then are manually inspected to attempt to identify defects and to determine the source and root cause of the defects so as to reduce material exposure and improve mean time to equipment repair and recovery. Manual inspection takes a lot of time, can be inaccurate, depends on the user that is performing the inspection, causes damage to substrate processing equipment, and uses more energy and materials. Manual attempts to determine a defect source, a root cause, and a corrective action associated with a defect is time consuming and has inaccuracies. This causes lower throughput, interruption of production, production of substrates that have performance data that does not meet threshold values, and so forth.

The devices, systems, and methods disclosed herein provide substrate defect analysis (e.g., defect source tracing and defect root cause identification including corrective action recommendation to improve mean time to equipment repair).

A processing device identifies property data of a substrate processed by a substrate processing system. In some embodiments, the property data is metrology data received from metrology equipment.

The processing device identifies, based on a first subset of the property data, regions of the substrate corresponding to a first defect category. In some examples, the first subset of the property data includes scanning electron microscope (SEM) images, energy dispersive x-ray microanalysis (EDX) images, and/or the like. In some examples, the first defect category includes line breaks, non-fills, bridges, stains, scratches, glass damage, foreign material (e.g., particles), residue, resist collapse, via stress, cavities, pits, crystal defects, cracks, and/or the like.

The processing device sub-categorizes, based on a second subset of the property data, the regions of the substrate corresponding to the first defect category into defect sub-categories. In some examples, the second subset of the property data includes morphology data, size attribute data, dimensional attribute data, defect distribution data, spatial location data, elemental analysis data, wafer signature data, chip layer, chip layout data, edge data, defect metadata including but not limited to grey level data and signal to noise data, and/or the like. In some examples, the defect sub-categories include sphere particles, random particles, rod-like particles, flake particles, post imprint fall-on particles, ring pits, micro pits, macro pits, mouse bites, chemical mechanical polishing (CMP) bridging, photo resist bridging, micro bridging, organic stains, inorganic stains, lithography pinching, step bunching, stacking faults, shallow triangles, obtuse triangles, surface triangles, down falls, ticks, chatter marks, crescents, micropipes, photoluminescent (PL) circles, basal plane dislocations, juts, hillocks, and/or the like.

The processing device causes, based on at least one of the plurality of defect sub-categories, performance of a corrective action associated with the substrate processing system. In some embodiments, the corrective action includes providing an alert, causing a cleaning process, causing a repair process, causing a substrate processing equipment part to be replaced, causing further inspection, causing Computational Process Control (CPC), causing Statistical Process Control (SPC) (e.g., SPC to compare to a graph of 3-sigma, etc.), causing Advanced Process Control (APC), causing model-based process control, causing preventative operative maintenance, causing design optimization, updating of manufacturing parameters, causing wafer recipe modification, causing feedback control, causing machine learning modification, and/or the like.

Aspects of the present disclosure result in technological advantages. The present disclosure avoids the time, inaccuracies, and subjectivity of conventional systems. The present disclosure produces substrates that have property data that better meets threshold values, has less damage to substrate processing equipment, has increased throughput, has less interruption of production, reduces test wafer usage, etc. compared to conventional solutions.

Although some embodiments of the present disclosure refer to substrate processing equipment and defects in substrates, in some embodiments, the present disclosure can be applied to other types of manufacturing equipment, other types of products, and other types of abnormalities.

FIG. 1 is a block diagram illustrating an exemplary system 100 (exemplary system architecture), according to certain embodiments. The system 100 (e.g., corrective action component 122 and/or predictive component 114) can perform the methods described herein (e.g., methods 500A-C of FIGS. 5A-C). The system 100 includes a client device 120, manufacturing equipment 124, sensors 126, metrology equipment 128, a predictive server 112, and a data store 140. In some embodiments, the predictive server 112 is part of a predictive system 110. In some embodiments, the predictive system 110 further includes server machines 170 and 180.

In some embodiments, one or more of the client device 120, manufacturing equipment 124, sensors 126, metrology equipment 128, predictive server 112, data store 140, server machine 170, and/or server machine 180 are coupled to each other via a network 130 for generating predictive data 160 to perform defect source tracing and defect root cause identification. In some embodiments, network 130 is a public network that provides client device 120 with access to the predictive server 112, data store 140, and other publicly available computing devices. In some embodiments, network 130 is a private network that provides client device 120 access to manufacturing equipment 124, sensors 126, metrology equipment 128, data store 140, and other privately available computing devices. In some embodiments, network 130 includes one or more Wide Area Networks (WANs), Local Area Networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, cloud computing networks, and/or a combination thereof.

In some embodiments, the client device 120 includes a computing device such as Personal Computers (PCs), laptops, mobile phones, smart phones, tablet computers, netbook computers, etc. In some embodiments, the client device 120 includes a corrective action component 122. In some embodiments, the corrective action component 122 may also be included in the predictive system 110 (e.g., machine learning processing system). In some embodiments, the corrective action component 122 is alternatively included in the predictive system 110 (e.g., instead of being included in client device 120). Client device 120 includes an operating system that allows users to one or more of consolidate, generate, view, or edit data, provide directives to the predictive system 110 (e.g., machine learning processing system), etc.

In some embodiments, corrective action component 122 receives one or more of user input (e.g., via a Graphical User Interface (GUI) displayed via the client device 120), property data 142, performance data 152, etc. In some embodiments, the corrective action component 122 transmits data (e.g., user input, property data 142, performance data 152, etc.) to the predictive system 110, receives predictive data 160 from the predictive system 110, determines a corrective action based on the predictive data 160, and causes the corrective action to be implemented. In some embodiments, the corrective action component 122 stores data (e.g., user input, property data 142, performance data 152, etc.) in the data store 140 and the predictive server 112 retrieves the data from the data store 140. In some embodiments, the predictive server 112 stores output (e.g., predictive data 160) of the trained machine learning model 190 in the data store 140 and the client device 120 retrieves the output from the data store 140. In some embodiments, the corrective action component 122 receives an indication of a corrective action (e.g., based on predictive data 160) from the predictive system 110 and causes performance of the corrective action.

In some embodiments, the predictive data 160 is associated with a corrective action. In some embodiments, a corrective action is associated with one or more of cleaning one or more portions of manufacturing equipment 124 (e.g., processing chamber), repairing one or more portions of the manufacturing equipment 124, replacing one or more portions of the manufacturing equipment 124, Computational Process Control (CPC), Statistical Process Control (SPC) (e.g., SPC to compare to a graph of 3-sigma, etc.), Advanced Process Control (APC), model-based process control, preventative operative maintenance, design optimization, updating of manufacturing parameters, wafer recipe modification, feedback control, machine learning modification, and/or the like. In some embodiments, the corrective action includes providing an alert (e.g., an alarm to not use one or more portions of the manufacturing equipment 124 if the predictive data 160 indicates a predicted abnormality). In some embodiments, the corrective action includes providing feedback control (e.g., cleaning, repairing, and/or replacing one or more portions of the manufacturing equipment 124 responsive to the predictive data 160 indicating a predicted abnormality). In some embodiments, the corrective action includes providing machine learning (e.g., causing modification of one or more portions of the manufacturing equipment 124 based on the predictive data 160).

In some embodiments, the predictive server 112, server machine 170, and server machine 180 each include one or more computing devices such as a rackmount server, a router computer, a server computer, a personal computer, a mainframe computer, a laptop computer, a tablet computer, a desktop computer, Graphics Processing Unit (GPU), accelerator Application-Specific Integrated Circuit (ASIC) (e.g., Tensor Processing Unit (TPU)), etc.

The predictive server 112 includes a predictive component 114. In some embodiments, the predictive component 114 receives property data 142 of a substrate (e.g., receive from the client device 120, retrieve from the data store 140) and generates predictive data 160 associated with performance of a corrective action (e.g., defect analysis, defect source tracing, defect root cause identification, defect translation, defect evolution, etc.). In some embodiments, the predictive component 114 uses one or more trained machine learning models 190 to determine the predictive data 160. In some embodiments, trained machine learning model 190 is trained using historical property data 144 and historical performance data 154.

In some embodiments, the predictive system 110 (e.g., predictive server 112, predictive component 114) generates predictive data 160 using supervised machine learning (e.g., supervised data set, historical property data 144 labeled with historical performance data 154, etc.). In some embodiments, the predictive system 110 generates predictive data 160 using semi-supervised learning (e.g., semi-supervised data set, performance data 152 is a predictive percentage, etc.). In some embodiments, the predictive system 110 generates predictive data 160 using unsupervised machine learning (e.g., unsupervised data set, clustering, clustering based on historical property data 144, etc.).

In some embodiments, the manufacturing equipment 124 (e.g., cluster tool, wafer backgrind systems, wafer saw equipment, die attach machines, wirebonders, die overcoat systems, molding equipment, hermetic sealing equipment, metal can welders, DTFS machines, branding equipment, lead finish equipment, and/or the like) is part of a substrate processing system (e.g., integrated processing system). The manufacturing equipment 124 includes one or more of a controller, an enclosure system (e.g., substrate carrier, front opening unified pod (FOUP), autoteach FOUP, process kit enclosure system, substrate enclosure system, cassette, etc.), a side storage pod (SSP), an aligner device (e.g., aligner chamber), a factory interface (e.g., equipment front end module (EFEM)), a load lock, a transfer chamber, one or more processing chambers, a robot arm (e.g., disposed in the transfer chamber, disposed in the front interface, etc.), and/or the like. The enclosure system, SSP, and load lock mount to the factory interface and a robot arm disposed in the factory interface is to transfer content (e.g., substrates, process kit rings, carriers, validation wafer, etc.) between the enclosure system, SSP, load lock, and factory interface. The aligner device is disposed in the factory interface to align the content. The load lock and the processing chambers mount to the transfer chamber and a robot arm disposed in the transfer chamber is to transfer content (e.g., substrates, process kit rings, carriers, validation wafer, etc.) between the load lock, the processing chambers, and the transfer chamber. In some embodiments, the manufacturing equipment 124 includes components of substrate processing systems. In some embodiments, the property data 142 of a substrate results from the substrate undergoing one or more processes performed by components of the manufacturing equipment 124 (e.g., etching, heating, cooling, transferring, processing, flowing, etc.).

In some embodiments, the sensors 126 provide property data 142 (e.g., sensor values, such as historical sensor values and current sensor values) of a substrate processed by manufacturing equipment 124. In some embodiments, the sensors 126 include one or more of an imaging sensor (e.g., SEM, camera, imaging device, etc.), a pressure sensor, a temperature sensor, a flow rate sensor, a spectroscopy sensor, and/or the like. In some embodiments, the property data 142 is used for equipment health and/or product health (e.g., product quality). In some embodiments, the property data 142 is received over a period of time.

In some embodiments, sensors 126 and/or metrology equipment 128 provide property data 142 including one or more of image data, SEM images, EDX images, morphology data, size attribute data, dimensional attribute data, defect distribution data, spatial location data, elemental analysis data, wafer signature data, chip layer, chip layout data, edge data, or defect metadata including but not limited to grey level data and signal to noise data, temperature, spacing, electrical current, power, voltage, and/or the like.

In some embodiments property data includes SEM images (e.g., images captured by a scanning electron microscope using a focused beam of electrons to scan a surface of a substrate to create a high-resolution image). In some embodiments property data includes EDX images (e.g., images generated from data that is collected using an x-ray technique to identify the elemental composition of materials). In some embodiments property data includes morphology data (e.g., data that relates to the form of a substrate). In some embodiments property data includes size attribute data (e.g., data describing the size of attributes of a substrate). In some embodiments property data includes dimensional attribute data (e.g., data that describes the dimensions of attributes of a substrate). In some embodiments property data includes defect distribution data (e.g., data that describes the distribution (e.g., spatial, temporal, etc.) of defects on a substrate). In some embodiments property data includes spatial location data (e.g., data that describes the spatial location of attributes, defects, elements, etc. of a substrate). In some embodiments property data includes elemental analysis data (e.g., data that describes the elemental composition of a substrate). In some embodiments property data includes wafer signature data (e.g., data that describes distribution of wafer defects of a substrate originating from a single manufacturing problem). In some embodiments, property data includes chip layer data (e.g., the certain layer or operation in the substrate manufacturing process). In some embodiments property data includes chip layout data (e.g., data that describes the layout of a substrate is terms of planar geometric shapes). In some embodiments property data includes edge data (e.g., data that describes the edge of a wafer (e.g., chipped edges, wafer edge thickness, wafer bow and/or warp)). In some embodiments property data includes defect metadata including but not limited to grey level data (e.g., data that describes the brightness of a pixel of an image of a substrate) and signal to noise data (e.g., data that describes the signal to noise ratio of a substrate measure with, for example, spectrometry equipment).

In some embodiments, the property data 142 (e.g., historical property data 144, current property data 146, etc.) is processed (e.g., by the client device 120 and/or by the predictive server 112). In some embodiments, processing of the property data 142 includes generating features. In some embodiments, the features are a pattern in the property data 142 (e.g., slope, width, height, peak, etc.) or a combination of values from the property data 142 (e.g., power derived from voltage and current, etc.). In some embodiments, the property data 142 includes features that are used by the predictive component 114 for obtaining predictive data 160.

In some embodiments, the metrology equipment 128 (e.g., imaging equipment, spectroscopy equipment, ellipsometry equipment, etc.) is used to determine metrology data (e.g., inspection data, image data, spectroscopy data, ellipsometry data, material compositional, optical, or structural data, etc.) corresponding to substrates produced by the manufacturing equipment 124 (e.g., substrate processing equipment). In some examples, after the manufacturing equipment 124 processes substrates, the metrology equipment 128 is used to inspect portions (e.g., layers) of the substrates. In some embodiments, the metrology equipment 128 performs scanning acoustic microscopy (SAM), ultrasonic inspection, x-ray inspection, and/or computed tomography (CT) inspection. In some examples, after the manufacturing equipment 124 deposits one or more layers on a substrate, the metrology equipment 128 is used to determine quality of the processed substrate (e.g., thicknesses of the layers, uniformity of the layers, interlayer spacing of the layer, and/or the like). In some embodiments, the metrology equipment 128 includes an imaging device (e.g., SAM equipment, ultrasonic equipment, x-ray equipment, CT equipment, and/or the like). In some embodiments, property data 142 includes sensor data from sensors 126 and/or metrology data from metrology equipment 128. In some embodiments, performance data 152 includes user input via client device 120 and/or metrology data from metrology equipment 128. Property data 142 may include metrology data from a first subset of the metrology equipment 128 and performance data 152 may include metrology data from a second subset of the metrology equipment 128.

In some embodiments, the data store 140 is memory (e.g., random access memory), a drive (e.g., a hard drive, a flash drive), a database system, or another type of component or device capable of storing data. In some embodiments, data store 140 includes multiple storage components (e.g., multiple drives or multiple databases) that span multiple computing devices (e.g., multiple server computers). In some embodiments, the data store 140 stores one or more of property data 142, performance data 152, and/or predictive data 160.

Property data 142 includes historical property data 144 and current property data 146. In some embodiments, property data 142 may include one or more of image data, SEM images, EDX images, morphology data, size attribute data, dimensional attribute data, defect distribution data, spatial location data, elemental analysis data, wafer signature data, chip layer, chip layout data, edge data, defect metadata including but not limited to grey level data and signal to noise data, and/or the like. In some embodiments, sensor data may include temperature data, temperature range, power data, comparison parameters for comparing inspection data with threshold data, threshold data, cooling rate data, cooling rate range, and/or the like. In some embodiments, at least a portion of the property data 142 is from sensors 126 and/or metrology equipment 128.

Performance data 152 includes historical performance data 154 and current performance data 156. Performance data 152 may be indicative of whether a substrate is properly designed, properly produced, and/or properly functioning. In some embodiments, at least a portion of the performance data 152 is associated with a quality of substrates produced by the manufacturing equipment 124. In some embodiments, at least a portion of the performance data 152 is based on metrology data from the metrology equipment 128 (e.g., historical performance data 154 includes metrology data indicating properly processed substrates, property data of substrates, yield, etc.). In some embodiments, at least a portion of the performance data 152 is based on inspection of the substrates (e.g., current performance data 156 based on actual inspection). In some embodiments, performance data 152 includes user input (e.g., via client device 120) indicating a quality of the substrates. In some embodiments, the performance data 152 includes an indication of an absolute value (e.g., inspection data of the bond interfaces indicates missing the threshold data by a calculated value, deformation value misses the threshold deformation value by a calculated value) or a relative value (e.g., inspection data of the bond interfaces indicates missing the threshold data by 5%, deformation misses threshold deformation by 5%). In some embodiments, the performance data 152 is indicative of meeting a threshold amount of error (e.g., at least 5% error in production, at least 5% error in flow, at least 5% error in deformation, specification limit).

In some embodiments, the client device 120 provides performance data 152 (e.g., product data). In some examples, the client device 120 provides (e.g., based on user input) performance data 152 that indicates an abnormality in products (e.g., defective products). In some embodiments, the performance data 152 includes an amount of products that have been produced that were normal or abnormal (e.g., 98% normal products). In some embodiments, the performance data 152 indicates an amount of products that are being produced that are predicted as normal or abnormal. In some embodiments, the performance data 152 includes one or more of yield a previous batch of products, average yield, predicted yield, predicted amount of defective or nondefective product, or the like. In some examples, responsive to yield on a first batch of products being 98% (e.g., 98% of the products were normal and 2% were abnormal), the client device 120 provides performance data 152 indicating that the upcoming batch of products is to have a yield of 98%.

In some embodiments, historical data includes one or more of historical property data 144 and/or historical performance data 154 (e.g., at least a portion for training the machine learning model 190). Current data includes one or more of current property data 146 and/or current performance data 156 (e.g., at least a portion to be input into the trained machine learning model 190 subsequent to training the model 190 using the historical data). In some embodiments, the current data is used for retraining the trained machine learning model 190.

In some embodiments, the predictive data 160 is to be used to cause performance of corrective actions on the manufacturing equipment, substrate processing system, or substrate processing equipment parts.

Performing multiple types of metrology on multiple layers of products to determine whether to perform a corrective action is costly in terms of time used, metrology equipment 128 used, energy consumed, bandwidth used to send the metrology data, processor overhead to process the metrology data, etc. By providing property data 142 to model 190 and receiving predictive data 160 from the model 190, system 100 has the technical advantage of avoiding the costly process of using multiple types of metrology equipment 128 on multiple layers of products and discarding substrates.

Performing manufacturing processes with manufacturing equipment 124 and/or manufacturing parameters that result in defective products is costly in time, energy, products, manufacturing equipment 124, the cost of identifying the corrective action to avoid causing the defective products, etc. By providing property data 142 to model 190, receiving predictive data 160 from the model 190, and causing a corrective action based on the predictive data 160, system 100 has the technical advantage of avoiding the cost of producing, identifying, and discarding defective substrates.

In some embodiments, predictive system 110 further includes server machine 170 and server machine 180. Server machine 170 includes a data set generator 172 that is capable of generating data sets (e.g., a set of data inputs and a set of target outputs) to train, validate, and/or test a machine learning model(s) 190. The data set generator 172 has functions of data gathering, compilation, reduction, and/or partitioning to put the data in a form for machine learning. In some embodiments (e.g., for small datasets), partitioning (e.g., explicit partitioning) for post-training validation is not used. Repeated cross-validation (e.g., 5-fold cross-validation, leave-one-out-cross-validation) may be used during training where a given dataset is in-effect repeatedly partitioned into different training and validation sets during training. A model (e.g., the best model, the model with the highest accuracy, etc.) is chosen from vectors of models over automatically-separated combinatoric subsets. In some embodiments, the data set generator 172 may explicitly partition the historical data (e.g., historical property data 144 and corresponding historical performance data 154) into a training set (e.g., sixty percent of the historical data), a validating set (e.g., twenty percent of the historical data), and a testing set (e.g., twenty percent of the historical data). In this embodiment, some operations of data set generator 172 are described in detail below with respect to FIG. 2. In some embodiments, the predictive system 110 (e.g., via predictive component 114) generates multiple sets of features (e.g., training features). In some examples a first set of features corresponds to a first set of types of property data (e.g., from a first set of sensors, first combination of values from first set of sensors, first patterns in the values from the first set of sensors) that correspond to each of the data sets (e.g., training set, validation set, and testing set) and a second set of features correspond to a second set of types of property data (e.g., from a second set of sensors different from the first set of sensors, second combination of values different from the first combination, second patterns different from the first patterns) that correspond to each of the data sets.

Server machine 180 includes a training engine 182, a validation engine 184, selection engine 185, and/or a testing engine 186. In some embodiments, an engine (e.g., training engine 182, a validation engine 184, selection engine 185, and a testing engine 186) refers to hardware (e.g., circuitry, dedicated logic, programmable logic, microcode, processing device, etc.), software (such as instructions run on a processing device, a general-purpose computer system, or a dedicated machine), firmware, microcode, or a combination thereof. The training engine 182 is capable of training a machine learning model 190 using one or more sets of features associated with the training set from data set generator 172. In some embodiments, the training engine 182 generates multiple trained machine learning models 190, where each trained machine learning model 190 corresponds to a distinct set of parameters of the training set (e.g., property data 142) and corresponding responses (e.g., performance data 152). In some embodiments, multiple models are trained on the same parameters with distinct targets for the purpose of modeling multiple effects. In some examples, a first trained machine learning model was trained using property data 142 from all sensors 126 (e.g., sensors 1-5), a second trained machine learning model was trained using a first subset of the property data (e.g., from sensors 1, 2, and 4), and a third trained machine learning model was trained using a second subset of the property data (e.g., from sensors 1, 3, 4, and 5) that partially overlaps the first subset of features.

The validation engine 184 is capable of validating a trained machine learning model 190 using a corresponding set of features of the validation set from data set generator 172. For example, a first trained machine learning model 190 that was trained using a first set of features of the training set is validated using the first set of features of the validation set. The validation engine 184 determines an accuracy of each of the trained machine learning models 190 based on the corresponding sets of features of the validation set. The validation engine 184 evaluates and flags (e.g., to be discarded) trained machine learning models 190 that have an accuracy that does not meet a threshold accuracy. In some embodiments, the selection engine 185 is capable of selecting one or more trained machine learning models 190 that have an accuracy that meets a threshold accuracy. In some embodiments, the selection engine 185 is capable of selecting the trained machine learning model 190 that has the highest accuracy of the trained machine learning models 190.

The testing engine 186 is capable of testing a trained machine learning model 190 using a corresponding set of features of a testing set from data set generator 172. For example, a first trained machine learning model 190 that was trained using a first set of features of the training set is tested using the first set of features of the testing set. The testing engine 186 determines a trained machine learning model 190 that has the highest accuracy of all of the trained machine learning models based on the testing sets.

In some embodiments, the machine learning model 190 (e.g., used for classification) refers to the model artifact that is created by the training engine 182 using a training set that includes data inputs and corresponding target outputs (e.g., correctly classifies a condition or ordinal level for respective training inputs). Patterns in the data sets can be found that map the data input to the target output (the correct classification or level), and the machine learning model 190 is provided mappings that captures these patterns. In some embodiments, the machine learning model 190 uses one or more of Gaussian Process Regression (GPR), Gaussian Process Classification (GPC), Bayesian Neural Networks, Neural Network Gaussian Processes, Deep Belief Network, Gaussian Mixture Model, or other Probabilistic Learning methods. Non probabilistic methods may also be used including one or more of Support Vector Machine (SVM), Radial Basis Function (RBF), clustering, Nearest Neighbor algorithm (k-NN), linear regression, random forest, neural network (e.g., artificial neural network), etc. In some embodiments, the machine learning model 190 is a multivariate analysis (MVA) regression model.

Predictive component 114 provides current property data 146 (e.g., as input) to the trained machine learning model 190 and runs the trained machine learning model 190 (e.g., on the input to obtain one or more outputs). The predictive component 114 is capable of determining (e.g., extracting) predictive data 160 from the trained machine learning model 190 and determines (e.g., extracts) uncertainty data that indicates a level of credibility that the predictive data 160 corresponds to current performance data 156. In some embodiments, the predictive component 114 or corrective action component 122 use the uncertainty data (e.g., uncertainty function or acquisition function derived from uncertainty function) to decide whether to use the predictive data 160 to perform a corrective action or whether to further train the model 190.

Figure 2:
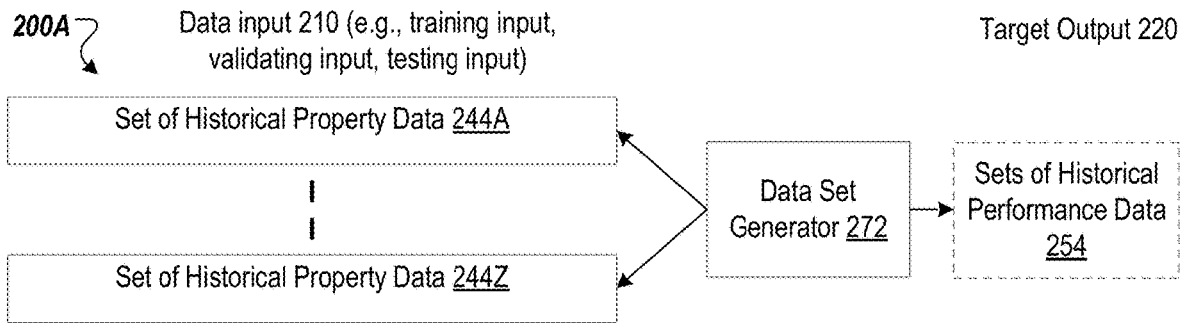
FIG. 2 depicts a block diagram of a system including an example data set generator to create data sets for a machine learning model, according to certain embodiments.

For purpose of illustration, rather than limitation, aspects of the disclosure describe the training of one or more machine learning models 190 using historical data (i.e., prior data, historical property data 144 and historical performance data 154) and providing current property data 146 into the one or more trained probabilistic machine learning models 190 to determine predictive data 160. In other implementations, a heuristic model or rule-based model is used to determine predictive data 160 (e.g., without using a trained machine learning model). In other implementations non-probabilistic machine learning models may be used. Predictive component 114 monitors historical property data 144 and historical performance data 154. In some embodiments, any of the information described with respect to data inputs 210 of FIG. 2 are monitored or otherwise used in the heuristic or rule-based model.

In some embodiments, the functions of client device 120, predictive server 112, server machine 170, and server machine 180 are to be provided by a fewer number of machines. For example, in some embodiments, server machines 170 and 180 are integrated into a single machine, while in some other embodiments, server machine 170, server machine 180, and predictive server 112 are integrated into a single machine. In some embodiments, client device 120 and predictive server 112 are integrated into a single machine.

In general, functions described in one embodiment as being performed by client device 120, predictive server 112, server machine 170, and server machine 180 can also be performed on predictive server 112 in other embodiments, if appropriate. In addition, the functionality attributed to a particular component can be performed by different or multiple components operating together. For example, in some embodiments, the predictive server 112 determines corrective actions based on the predictive data 160. In another example, client device 120 determines the predictive data 160 based on data received from the trained machine learning model.

In addition, the functions of a particular component can be performed by different or multiple components operating together. In some embodiments, one or more of the predictive server 112, server machine 170, or server machine 180 are accessed as a service provided to other systems or devices through appropriate application programming interfaces (API).

In some embodiments, a "user" is represented as a single individual. However, other embodiments of the disclosure encompass a "user" being an entity controlled by a plurality of users and/or an automated source. In some examples, a set of individual users federated as a group of administrators is considered a "user."

Although embodiments of the disclosure are discussed in terms of determining predictive data 160 for defect source tracing and defect root cause identification in substrate processing in manufacturing facilities (e.g., substrate processing facilities), in some embodiments, the disclosure can also be generally applied to quality detection. Embodiments can be generally applied to determining quality of parts based on different types of data.

FIG. 2 depicts a block diagram of a system 200A including an example data set generator 272 (e.g., data set generator 172 of FIG. 1) to create data sets for a machine learning model (e.g., model 190 of FIG. 1, according to certain embodiments. In some embodiments, data set generator 272 is part of server machine 170 of FIG. 1. The data sets generated by data set generator 272 of FIG. 2 may be used to train a machine learning model (e.g., see FIG. 5B) to cause performance of a corrective action (e.g., see FIG. 5C).

Data set generator 272 (e.g., data set generator 172 of FIG. 1) creates data sets for a machine learning model (e.g., model 190 of FIG. 1). Data set generator 272 creates data sets using historical property data 244 (e.g., historical property data 144 of FIG. 1) and historical performance data 254 (e.g., historical performance data 154 of FIG. 1). System 200 of FIG. 2 illustrates data set generator 272, data inputs 210, and target output 220 (e.g., target data).

In some embodiments, data set generator 272 generates a data set (e.g., training set, validating set, testing set) that includes one or more data inputs 210 (e.g., training input, validating input, testing input). In some embodiments, data set generator 272 does not generate target output (e.g., for unsupervised learning). In some embodiments, data set generator generates one or more target outputs 220 (e.g., for supervised learning) that correspond to the data inputs 210. The data set may also include mapping data that maps the data inputs 210 to the target outputs 220. Data inputs 210 are also referred to as "features," "attributes," or "information." In some embodiments, data set generator 272 provides the data set to the training engine 182, validating engine 184, or testing engine 186, where the data set is used to train, validate, or test the machine learning model 190.

In some embodiments, data set generator 272 generates the data input 210 and target output 220. In some embodiments, data inputs 210 include one or more sets of historical property data 244. In some embodiments, historical property data 244 includes one or more of property data from one or more types of sensors and/or metrology equipment, combination of property data from one or more types of sensors and/or metrology equipment, patterns from property data from one or more types of sensors and/or metrology equipment, and/or the like.

In some embodiments, data set generator 272 generates a first data input corresponding to a first set of historical property data 244A to train, validate, or test a first machine learning model and the data set generator 272 generates a second data input corresponding to a second set of historical property data 244B to train, validate, or test a second machine learning model.

In some embodiments, the data set generator 272 discretizes (e.g., segments) one or more of the data input 210 or the target output 220 (e.g., to use in classification algorithms for regression problems). Discretization (e.g., segmentation via a sliding window) of the data input 210 or target output 220 transforms continuous values of variables into discrete values. In some embodiments, the discrete values for the data input 210 indicate discrete historical property data 244 to obtain a target output 220 (e.g., discrete historical performance data 254).

Data inputs 210 and target outputs 220 to train, validate, or test a machine learning model include information for a particular facility (e.g., for a particular substrate manufacturing facility). In some examples, historical property data 244 and historical performance data 254 are for the same manufacturing facility.

In some embodiments, the information used to train the machine learning model is from specific types of manufacturing equipment 124 of the manufacturing facility having specific characteristics and allow the trained machine learning model to determine outcomes for a specific group of manufacturing equipment 124 based on input for current parameters (e.g., current property data 146) associated with one or more components sharing characteristics of the specific group. In some embodiments, the information used to train the machine learning model is for components from two or more manufacturing facilities and allows the trained machine learning model to determine outcomes for components based on input from one manufacturing facility.

In some embodiments, subsequent to generating a data set and training, validating, or testing a machine learning model 190 using the data set, the machine learning model 190 is further trained, validated, or tested (e.g., current performance data 156 of FIG. 1) or adjusted (e.g., adjusting weights associated with input data of the machine learning model 190, such as connection weights in a neural network).

Figure 3:
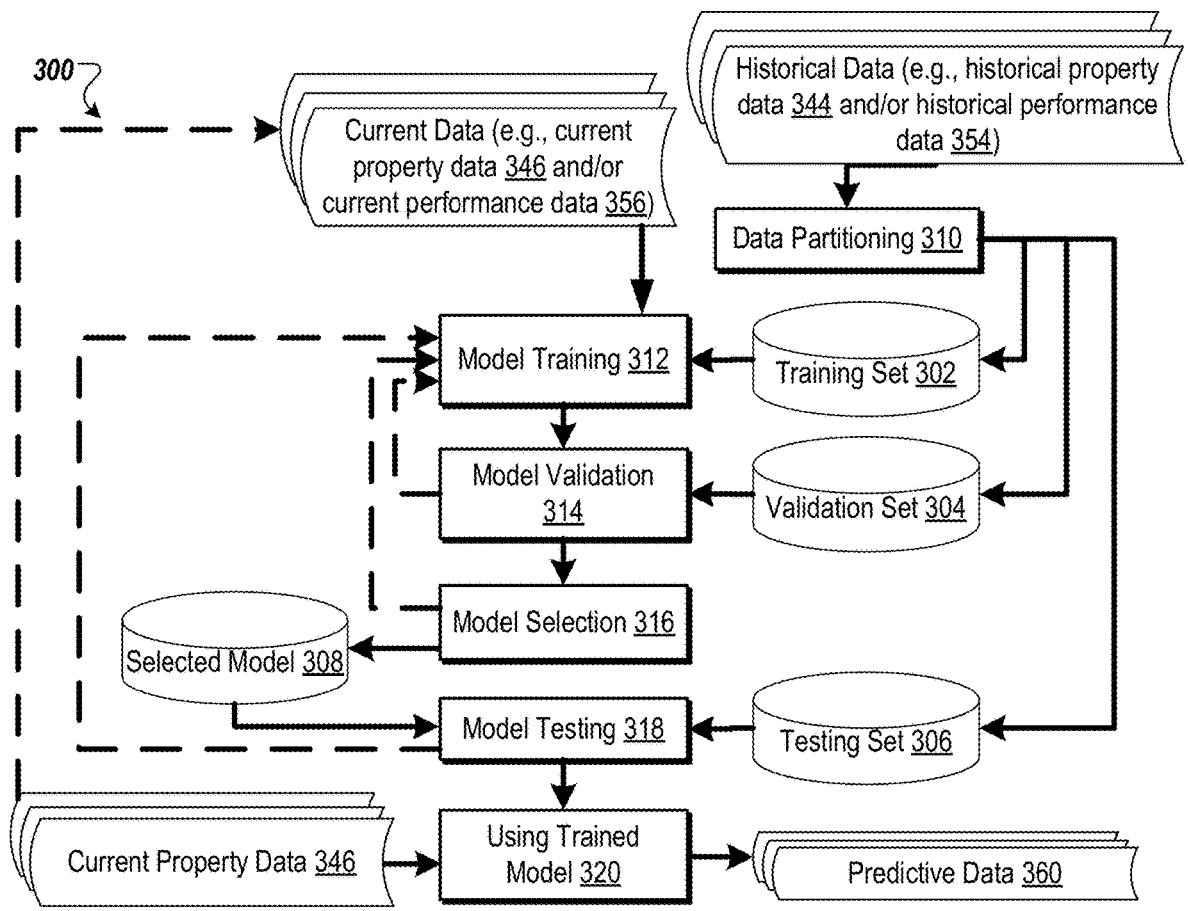
FIG. 3 is a block diagram illustrating determining predictive data, according to certain embodiments.

FIG. 3 is a block diagram illustrating a system 300 for generating predictive data 360 (e.g., predictive data 160 of FIG. 1), according to certain embodiments. The system 300 is used to determine predictive data 360 via a trained machine learning model (e.g., model 190 of FIG. 1) for defect source tracing and defect root cause identification (e.g., for performance of a corrective action).

At block 310, the system 300 (e.g., predictive system 110 of FIG. 1) performs data partitioning (e.g., via data set generator 172 of server machine 170 of FIG. 1) of the historical data (e.g., historical property data 344 and/or historical performance data 354 for model 190 of FIG. 1) to generate the training set 302, validation set 304, and testing set 306. In some examples, the training set is 60% of the historical data, the validation set is 20% of the historical data, and the testing set is 20% of the historical data. The system 300 generates a plurality of sets of features for each of the training set, the validation set, and the testing set. In some examples, if the historical data includes features derived from 20 sensors (e.g., sensors 126 of FIG. 1, sensors of manufacturing equipment and/or metrology equipment) and 100 products (e.g., products that each correspond to property data from the 20 sensors), a first set of features is sensors 1-10, a second set of features is sensors 11-20, the training set is products 1-60, the validation set is products 61-80, and the testing set is products 81-100. In this example, the first set of features of the training set would be parameters from sensors 1-10 for products 1-60.

At block 312, the system 300 performs model training (e.g., via training engine 182 of FIG. 1) using the training set 302. In some embodiments, the system 300 trains multiple models using multiple sets of features of the training set 302 (e.g., a first set of features of the training set 302, a second set of features of the training set 302, etc.). For example, system 300 trains a machine learning model to generate a first trained machine learning model using the first set of features in the training set (e.g., property data from sensors 1-10 for products 1-60) and to generate a second trained machine learning model using the second set of features in the training set (e.g., property data from sensors 11-20 for products 1-60). In some embodiments, the first trained machine learning model and the second trained machine learning model are combined to generate a third trained machine learning model (e.g., which is a better predictor than the first or the second trained machine learning model on its own in some embodiments). In some embodiments, sets of features used in comparing models overlap (e.g., first set of features being property data from sensors 1-15 and second set of features being property data from sensors 5-20). In some embodiments, hundreds of models are generated including models with various permutations of features and combinations of models.

At block 314, the system 300 performs model validation (e.g., via validation engine 184 of FIG. 1) using the validation set 304. The system 300 validates each of the trained models using a corresponding set of features of the validation set 304. For example, system 300 validates the first trained machine learning model using the first set of features in the validation set (e.g., parameters from sensors 1-10 for products 61-80) and the second trained machine learning model using the second set of features in the validation set (e.g., parameters from sensors 11-20 for products 61-80). In some embodiments, the system 300 validates hundreds of models (e.g., models with various permutations of features, combinations of models, etc.) generated at block 312. At block 314, the system 300 determines an accuracy of each of the one or more trained models (e.g., via model validation) and determines whether one or more of the trained models has an accuracy that meets a threshold accuracy. Responsive to determining that none of the trained models has an accuracy that meets a threshold accuracy, flow returns to block 312 where the system 300 performs model training using different sets of features of the training set. Responsive to determining that one or more of the trained models has an accuracy that meets a threshold accuracy, flow continues to block 316. The system 300 discards the trained machine learning models that have an accuracy that is below the threshold accuracy (e.g., based on the validation set).

At block 316, the system 300 performs model selection (e.g., via selection engine 185 of FIG. 1) to determine which of the one or more trained models that meet the threshold accuracy has the highest accuracy (e.g., the selected model 308, based on the validating of block 314). Responsive to determining that two or more of the trained models that meet the threshold accuracy have the same accuracy, flow returns to block 312 where the system 300 performs model training using further refined training sets corresponding to further refined sets of features for determining a trained model that has the highest accuracy.

At block 318, the system 300 performs model testing (e.g., via testing engine 186 of FIG. 1) using the testing set 306 to test the selected model 308. The system 300 tests, using the first set of features in the testing set (e.g., property data from sensors 1-10 for products 81-100), the first trained machine learning model to determine the first trained machine learning model meets a threshold accuracy (e.g., based on the first set of features of the testing set 306). Responsive to accuracy of the selected model 308 not meeting the threshold accuracy (e.g., the selected model 308 is overly fit to the training set 302 and/or validation set 304 and is not applicable to other data sets such as the testing set 306), flow continues to block 312 where the system 300 performs model training (e.g., retraining) using different training sets corresponding to different sets of features (e.g., property data from different sensors). Responsive to determining that the selected model 308 has an accuracy that meets a threshold accuracy based on the testing set 306, flow continues to block 320. In at least block 312, the model learns patterns in the historical data to make predictions and in block 318, the system 300 applies the model on the remaining data (e.g., testing set 306) to test the predictions.

At block 320, system 300 uses the trained model (e.g., selected model 308) to receive current property data 346 (e.g., current property data 146 of FIG. 1) and determines (e.g., extracts), from the trained model, predictive data 360 (e.g., predictive data 160 of FIG. 1) for defect source tracing and defect root cause identification to perform a corrective action. In some embodiments, the current property data 346 corresponds to the same types of features in the historical property data 344. In some embodiments, the current property data 346 corresponds to a same type of features as a subset of the types of features in historical property data 344 that is used to train the selected model 308.

In some embodiments, current data is received. In some embodiments, current data includes current performance data 356 (e.g., current performance data 156 of FIG. 1) and/or current property data 346. In some embodiments, at least a portion of the current data is received from metrology equipment (e.g., metrology equipment 128 of FIG. 1) or via user input. In some embodiments, the model 308 is re-trained based on the current data. In some embodiments, a new model is trained based on the current performance data 356 and the current property data 346.

In some embodiments, one or more of the blocks 310-320 occur in various orders and/or with other operations not presented and described herein. In some embodiments, one or more of blocks 310-320 are not to be performed. For example, in some embodiments, one or more of data partitioning of block 310, model validation of block 314, model selection of block 316, and/or model testing of block 318 are not to be performed.

Figure 4A:
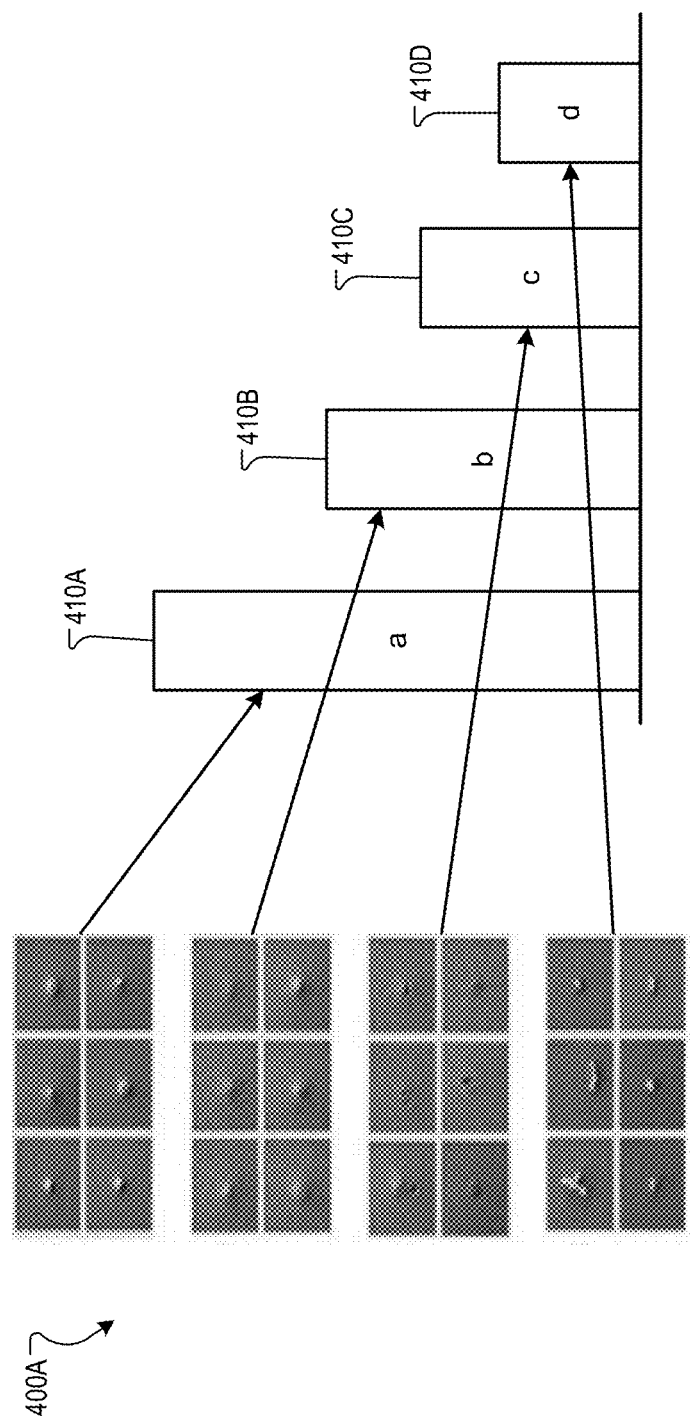
FIG. 4A is a block diagram illustrating defect categories, according to certain embodiments.

FIG. 4A is a block diagram illustrating defect categories 410A-D, according to certain embodiments. Property data can include different types of property data 400A-Z (e.g., different subsets of property data) from one or more types of sensors and/or one or more types of metrology equipment. In some embodiments, as shown in FIG. 4A, a processing device may identify, based on property data 400A (e.g., a first subset of property data 400), regions of a substrate corresponding to defect categories 410A-D.

In some embodiments, property data 400A includes SEM images captured by SEM metrology equipment, EDX images captured by EDX metrology equipment, and/or the like, morphology data, size attribute data, dimensional attribute data, defect distribution data, spatial location data, elemental analysis data, wafer signature data, chip layer, chip layout data, edge data, defect metadata including but not limited to grey level data and signal to noise data, and/or the like. The property data 400A may be associated with (e.g., captured at) different regions of a substrate. A processing device may determine, based on property data 400A, that particular regions of the substrate include defects of particular defect categories 410A-D.

A defect category 410 may include one or more of line breaks, non-fills, bridges, stains, scratches, glass damage, foreign material (particles), residue, resist collapse, z-axis defects, large areas, via stress, cavities, pits, crystal defects, cracks, and/or the like.

Figure 4B:
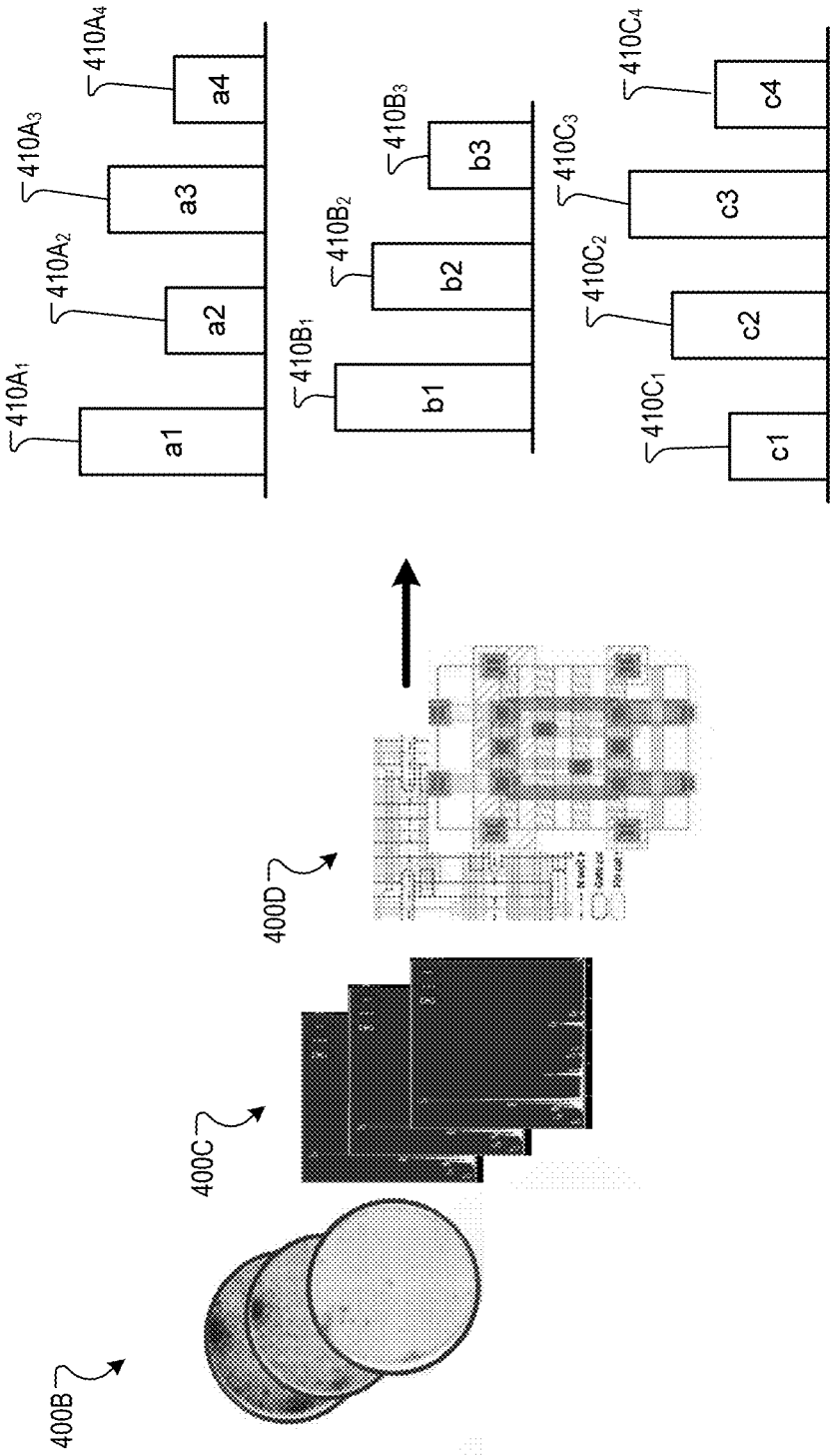
FIG. 4B is a block diagram illustrating defect sub-categories, according to certain embodiments.

FIG. 4B is a block diagram illustrating defect sub-categories, according to certain embodiments. In some embodiments, as shown in FIG. 4B, a processing device sub-categorizes, based on property data 400B-D (e.g., a second subset of the property data), the regions of the substrate corresponding to the defect category 410A into defect sub-categories $410A_{1-4}$, the regions of the substrate corresponding to the defect category 410B into defect sub-categories $410B_{1-3}$, and the regions of the substrate corresponding to the defect category 410C into defect sub-categories $410C_{1-4}$.

A defect sub-category may include sphere particles, random particles, rod-like particles, flake particles, post imprint fall-on particles, ring pits, micro pits, macro pits, mouse bites, multi-line bridging, CMP bridging, photo resist bridging, micro bridging, organic stains, inorganic stains, lithography pinching, step bunching, stacking faults, shallow triangles, obtuse triangles, surface triangles, down falls, ticks, chatter marks, crescents, micropipes, PL circles, basal plane dislocations, juts, hillocks, and/or the like.

In some embodiments, property data 400B-C can include one or more of SEM images, EDX images, morphology data, size attribute data, dimensional attribute data, defect distribution data, spatial location data, elemental analysis data, wafer signature data, chip layer, chip layout data, edge data, defect metadata including but not limited to grey level data and signal to noise data, and/or the like. In some embodiments, property data 400A includes SEM images, property data 400B includes a defect map, property data 400C includes EDX data (e.g., EDX images generated via X-ray fluorescence (XRF), inductively coupled plasma mass spectrometry (ICP-MS), Triple quadrupole ICP-MS (ICP-QQQ), etc.), and property data 400D includes chip layout.

Figure 4C:
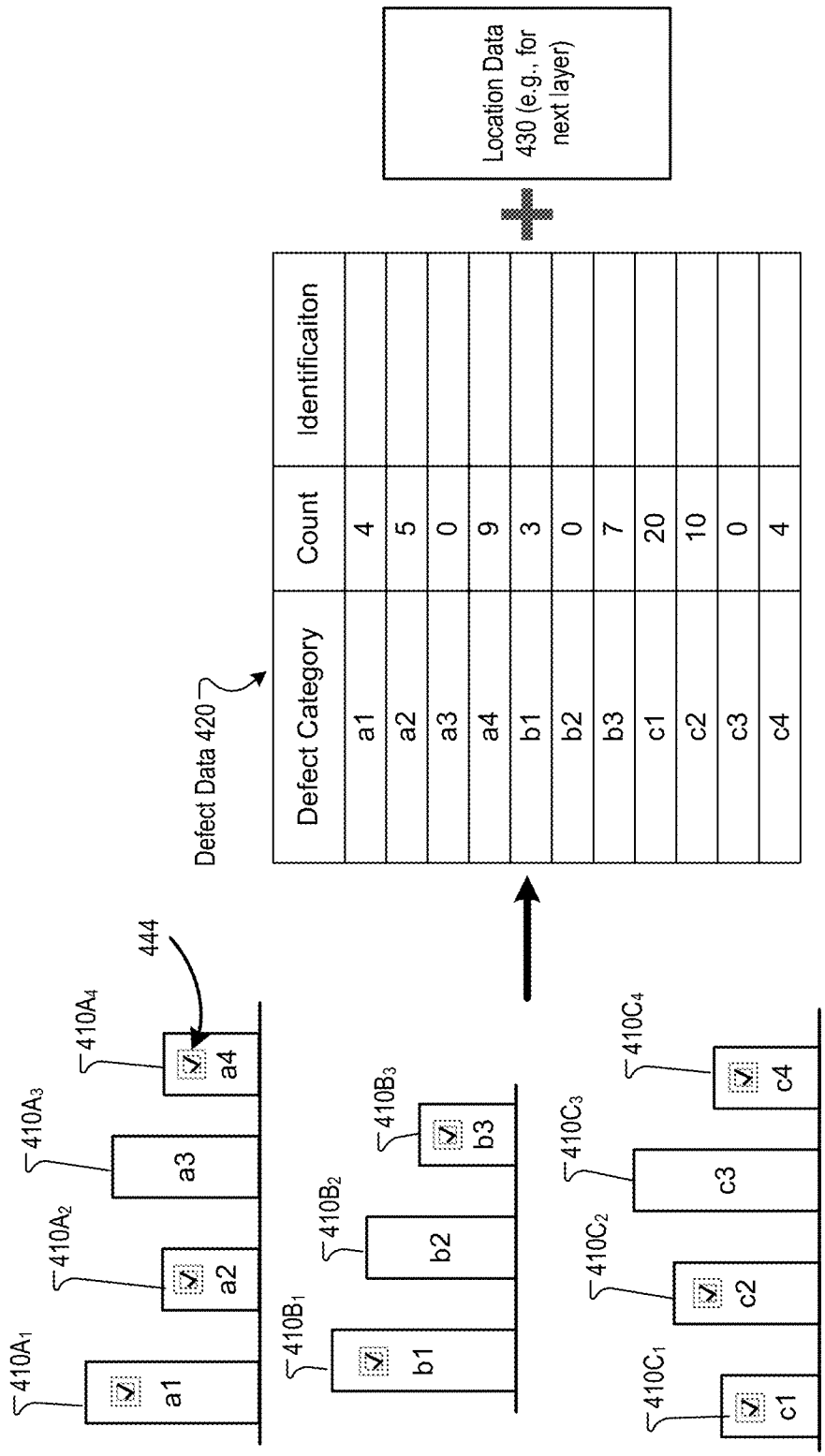
FIG. 4C is a block diagram associated with defect sub-categories, according to certain embodiments.

FIG. 4C is a block diagram associated with defect sub-categories, according to certain embodiments. In some embodiments, as shown in FIG. 4C, a processing device identifies a subset of the defect sub-categories that corresponds to performance of a corrective action (e.g., defect sub-categories of interest). In some embodiments, the subset of the defect sub-categories is determined based on user input 444 indicative of one or more sub-categories of interest. In some embodiments, the defect sub-categories are determined based on machine learning. In some embodiments, the defect sub-categories are determined based on threshold values.

In some embodiments a processing device may compile defect data 420 and location data 430 to follow each defect from layer to layer or operation to operation in a substrate manufacturing process. For example, in some embodiments, a processing device may identify a defect (e.g., property data) and based on defect evolution information, identify a prior process operation where the defect source or defect root cause originated. Location data may include wafer mapping coordinates and an identification (e.g., layer number, or process operation number) to indicate the location on the substrate and layer/operation of such data. For example, location data may be stored using a wafer mapping (e.g., KLA result file (KLARF)). In some embodiments, a user identifies a subset of the defect sub-categories (e.g., $410A_1$, $410A_2$, $410A_4$, $410B_1$, $410B_2$, $410C_1$, $410C_2$, $410C_4$) by user input 444. Further, the processing device may add the location data corresponding to each identified defect subcategory to the location data 430 of the next or a subsequent layer. The processing logic identifies the regions corresponding to the identified defect subcategories and identifies further property data of the region including location data.

In some embodiments, one of the defect sub-categories may be selected and the defect mapping coordinates of the corresponding regions of the defect sub-category may be appended onto corresponding location data (e.g., defect map) of one or more subsequent layers to generate location data (e.g., a defect map) for a subsequent layer (e.g., KLA result file (KLARF), etc.). In some embodiments, a portion of the defect mapping coordinates of the corresponding regions of the defect sub-category may be selected and the selected portion of the defect mapping coordinates of the corresponding regions of the defect sub-category may be appended to the defect map of the subsequent layer.

In some embodiments, location data of a subsequent layer of the substrate may be identified. The location data may correspond to the defect mapping coordinates of the previously selected defect sub-category of the corresponding regions of the defect sub-category. In some embodiments, a defect evolution database entry may be created comprising property data from each layer comprising one or more defect images, location data, and defect evolution information of the defect that comprises one or more defect evolution images. In some embodiments, the defect evolution database entry may be stored for subsequent access. In some embodiments, property data of a layer of the substrate may be identified and based on the defect evolution database entry, the property data may be matched to a database entry of defect evolution information. Based on the defect evolution information, a defect may be traced to the defect source, or the defect root cause may be identified and performance of a corrective action associated with the substrate processing system may be caused based on the defect source or defect root cause. In some embodiments, the defect source or the defect root cause may have occurred due to a defect or deficiency in a prior process corresponding to a prior layer of the substrate manufacturing process.

A defect that causes failure of a substrate may be referred to as killing a substrate. A kill ratio may be a percentage of that substrates that have a type of defect that undergo failure. A defect that does not affect functionality of a substrate has a low kill rate. For example, a defect resulting from a first substrate processing operation that is etched off of the substrate in a second substrate processing operation may have a low kill ratio. A defect that often prevents proper functionality of a substrate has a high kill rate. For example, a defect resulting from a substrate processing operation that is not removed by subsequent operations may have a high kill rate. A defect with a low kill ratio may be more permissible than a defect with a high kill ratio. In some embodiments, a defect subcategory may contain defects that do not cause performance data 152 of the manufactured substrate to fall below a certain threshold (e.g., a low kill ratio, etc.).

Figure 4D:
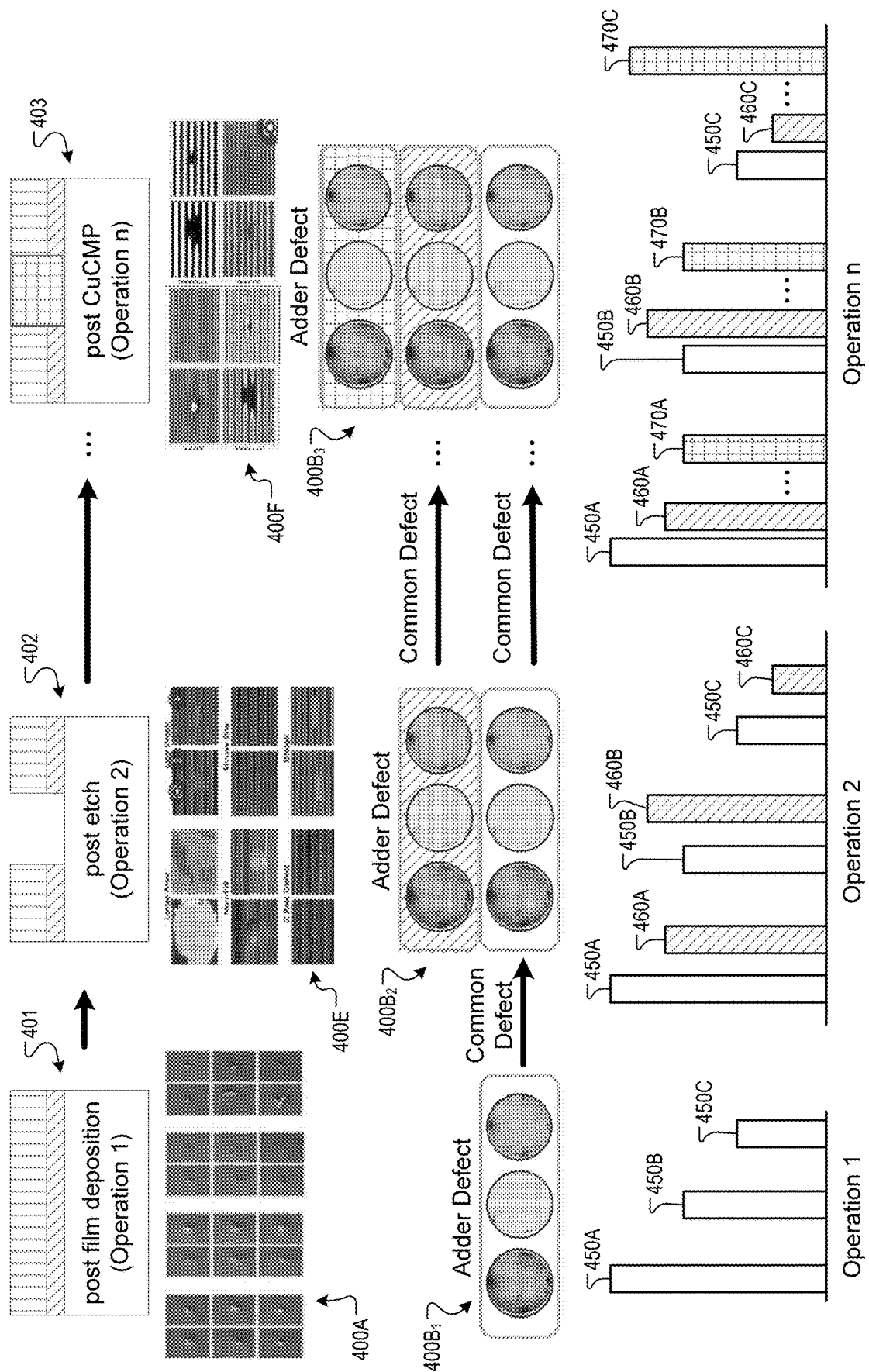
FIG. 4D is a block diagram illustrating substrate defects, according to certain embodiments.

FIG. 4D is a block diagram illustrating substrate defects (e.g., adder and common defects), according to certain embodiments. In some embodiments, as shown in FIG. 4D, a processing device identifies property data 400A (e.g., a first subset of property data 400) of a substrate 401. In some embodiments, substrate 401 has undergone an operation 1 of a manufacturing process. In some embodiments, a substrate 402 may be substrate 401 after undergoing an operation 2 of a manufacturing process. In some embodiments, a substrate 403 may be a substrate 402 after undergoing an operation n of a manufacturing process. In some embodiments, property data 400A includes location data $400B_1$ of the regions of the substrate corresponding to defect categories 450A-C. Such location data $400B_1$ may be identified as adder defects (e.g., new defects or defects that are not carried over from a previous layer or operation in the substrate manufacturing process). In some embodiments, as shown in FIG. 4D, a processing device may identify, based on property data 400A (e.g., a first subset of property data 400), regions of a substrate corresponding to defect categories 450A-C. In some embodiments, the processing logic maps the regions of the substrate corresponding to the defect categories as location data $400B_1$ (e.g., defect mapping, KLARF, etc.).

In some embodiments, a subsequent operation (e.g., operation 2) is performed on the substrate 401. In some embodiments, a processing device identifies property data 400E (e.g., a second subset of property data 400) of substrate 402 (e.g., substrate 401 after undergoing operation 2 of a substrate manufacturing process). In some embodiments, the property data 400E includes location data $400B_2$ of the regions of the substrate corresponding to defect categories 460A-C. In some embodiments, as shown in FIG. 4D, a processing device may identify, based on property data 400E (e.g., a second subset of property data 400), regions of a substrate corresponding to defect categories 460A-C. In some embodiments, location data $400B_2$ may be identified as adder defects (e.g., new defects or defects that are not carried over from a previous layer or operation in the substrate manufacturing process). In some embodiments, location data $400B_1$ may be common defects (e.g., old defects or defects that were carried over from a previous layer or operations in the substrate manufacturing process). In some embodiments, the processing logic does not map the regions of the substrate corresponding to the defect categories that are common defects. In some embodiments, the processing device maps the regions of the substrate corresponding to the defect categories as location data $400B_2$ (e.g., defect mapping, KLARF, etc.).

In some embodiments, a subsequent operation (e.g., operation n) is performed on the substrate 402. In some embodiments, a processing device identifies property data 400F (e.g., a third subset of property data 400) of substrate 403 (e.g., substrate 402 after undergoing operation n of a substrate manufacturing process). In some embodiments, the property data 400F includes location data $400B_3$ of the regions of the substrate corresponding to defect categories 470A-C. In some embodiments, as shown in FIG. 4D, a processing device may identify, based on property data 400F (e.g., a third subset of property data 400), regions of a substrate corresponding to defect categories 470A-C. In some embodiments, location data $400B_3$ may be identified as adder defects (e.g., new defects or defects that are not carried over from a previous layer or operation in the substrate manufacturing process). In some embodiments, location data $400B_1$-$B_2$ may be common defects (e.g., old defects or defects that were carried over from a previous layer or operation in the substrate manufacturing process). In some embodiments, the processing logic does not map the regions of the substrate corresponding to the defect categories that are common defects. In some embodiments, the processing logic maps the regions of the substrate corresponding to the defect categories as location data $400B_3$ (e.g., defect mapping, KLARF, etc.).

In some embodiments, as described in FIG. 4C, a subset of the defect sub-categories (e.g., 450A of operation 1) may be identified (e.g., via user input 444, via a processing device). Further, the processing device may add the location data corresponding to each identified defect subcategory (e.g., 450A) corresponding to the regions of the substrate to the location data 430 of the next layer (e.g., operation 2) even though such location data may be common defects. In some embodiments, adding the location data corresponding to an identified defect subcategory corresponding to the regions of the substrate to the location data of the next layer allows defect evolution to be observed from operation to operation and layer to layer.

In some embodiments, property data corresponding to a selected defect sub-category (e.g., defect images, mapping coordinates of the corresponding regions of the defect sub-category, etc.) may be identified (e.g., via user input 444, via a processing device). In some embodiments, a processing device may create a database entry (defect database entry, defect evolution database entry, etc.) including the property data from each layer (e.g., one or more defect images and defect evolution information of the defect that includes one or more defect evolution images). In some embodiments, a defect evolution image may include multiple images of a defect from multiple layers of the substrate corresponding to distinct operations in the manufacturing process. The processing device may store the database entry in a database (e.g., defect database, defect evolution database, knowledge database, etc.) for subsequent access.

In some embodiments, a processing device may identify property data of a substrate processed by a substrate processing system. In some embodiments, the processing device may identify, based on a first subset of the property data, regions of the substrate corresponding to a first defect category. In some embodiments, the processing device may sub-categorize, based on a second subset of the property data, the regions of the substrate corresponding to the first defect category into defect sub-categories. In some embodiments, the processing device may cause, based on one or more of the regions corresponding to at least one of the defect sub-categories, performance of a corrective action associated with the substrate processing system. In some embodiments, the processing device may determine a defect source (e.g., defect source tracing) based on the at least one of the defect sub-categories, the corrective action corresponding to the defect source. In some embodiments, the processing device may determine a defect root cause (e.g., defect root cause identification) based on the at least one of the defect sub-categories, the corrective action corresponding to the defect root cause. In some embodiments, the defect source or defect root cause may correspond to a prior layer of the substrate and/or a prior process operation in the substrate manufacturing process. In some embodiments, the processing device may determine the defect source and/or the defect root cause based on defect evolution information. In some embodiments, the defect evolution information may be stored in a defect evolution database.

In some embodiments, the processing device may search a database (e.g., defect evolution database) for a database entry with historical property data substantially similar to (e.g., most analogous with) the current property data (e.g., defect image or) and match the current property data corresponding to the defect to the a defect evolution entry that is substantially similar (e.g., most analogous defect evolution database entry). In some embodiments, the processing device may correlate the search result (e.g., the defect evolution entry that is substantially similar, the most analogous database entry) with, for example, a defect source, defect root cause, and/or a corrective action(s) within a certain confidence metric. In some embodiments, the processing device may identify a defect source, defect root cause, and/or a corrective action. In some embodiments, the defect source and/or defect root cause may correspond to a prior operation in the substrate manufacturing process. In some embodiments, the defect source, defect root cause, and/or corrective action may correspond to manufacturing equipment previously used in the substrate manufacturing process.

In some embodiments, prior operations in the substrate manufacturing process may be wet cleans, surface passivation, photolithography, ion implantation, etching, dry etching, reactive-ion etching (RIE), deep reactive-ion etching, atomic layer etching (ALE), wet etching, buffered oxide etching, plasma ashing, thermal treatments, rapid thermal annealing, furnace annealing, thermal oxidation, chemical vapor deposition (CVD), atomic layer deposition (ALD), physical vapor deposition (PVD), molecular beam epitaxy (MBE), laser lift-off, electrochemical deposition (ECD), chemical-mechanical polishing (CMP), wafer testing, die preparation, through-silicon via manufacture, wafer mounting, wafer backgrinding and polishing, wafer bonding and stacking, redistribution layer manufacture, wafer bumping, die cutting or wafer dicing, IC packaging, die attachment, molding, baking, electroplating, laser marking or silkscreen printing, IC testing, and/or the like.

In some embodiments, during a defect out of control (OOC) event in a substrate manufacturing system (e.g., substrate manufacturing facility) a processing device may identify property data corresponding to the OOC defect. The processing device may search the database (e.g., knowledge database) for the database entry most analogous with the property data (e.g., defect image or defect evolution image(s)) and match the property data corresponding to the OOC defect to the most analogous database entry. The processing device may correlate the search result (e.g., the most analogous database entry) with, for example, a defect source, defect root cause, and/or a corrective action(s) within a certain confidence metric. In some embodiments, the processing device or user may review the recommendation and formulate and action plan.

Figure 5A:
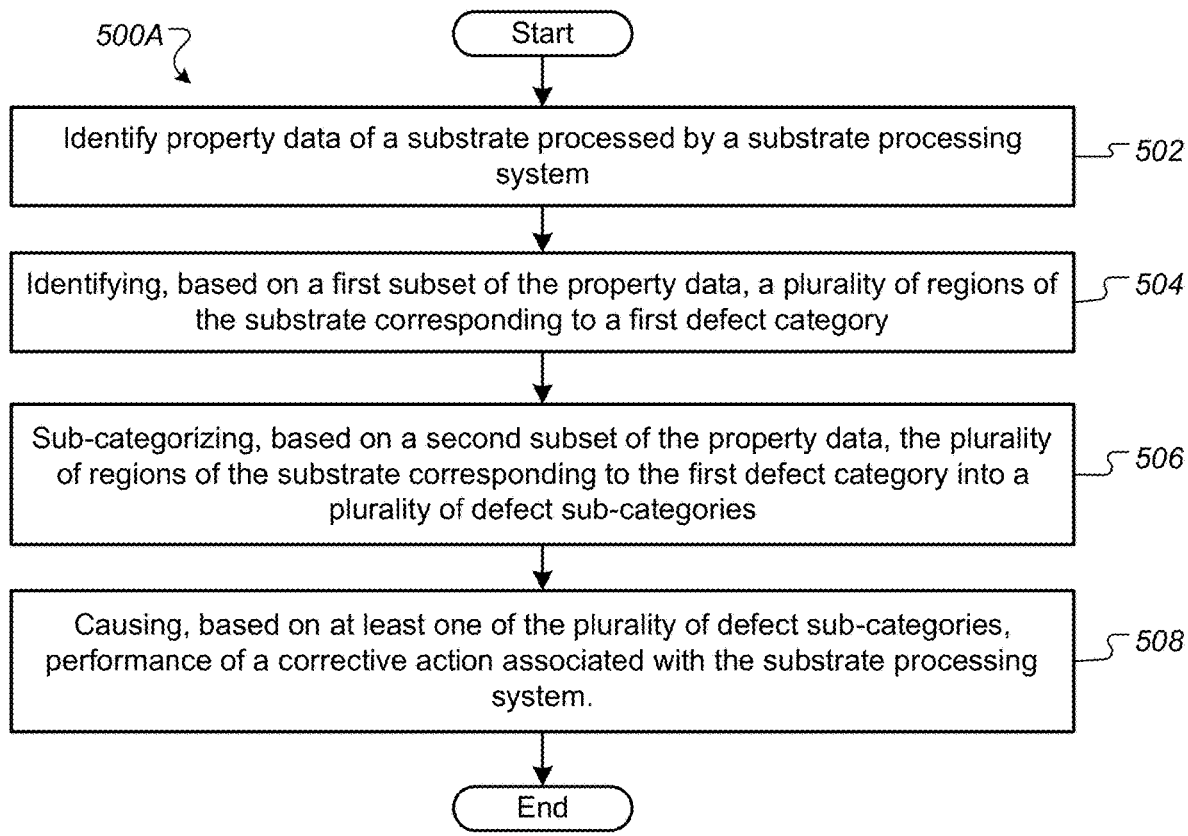
FIG. 5A-C are flow diagrams of a methods associated with defect analysis, according to certain embodiments.
Figure 5B:
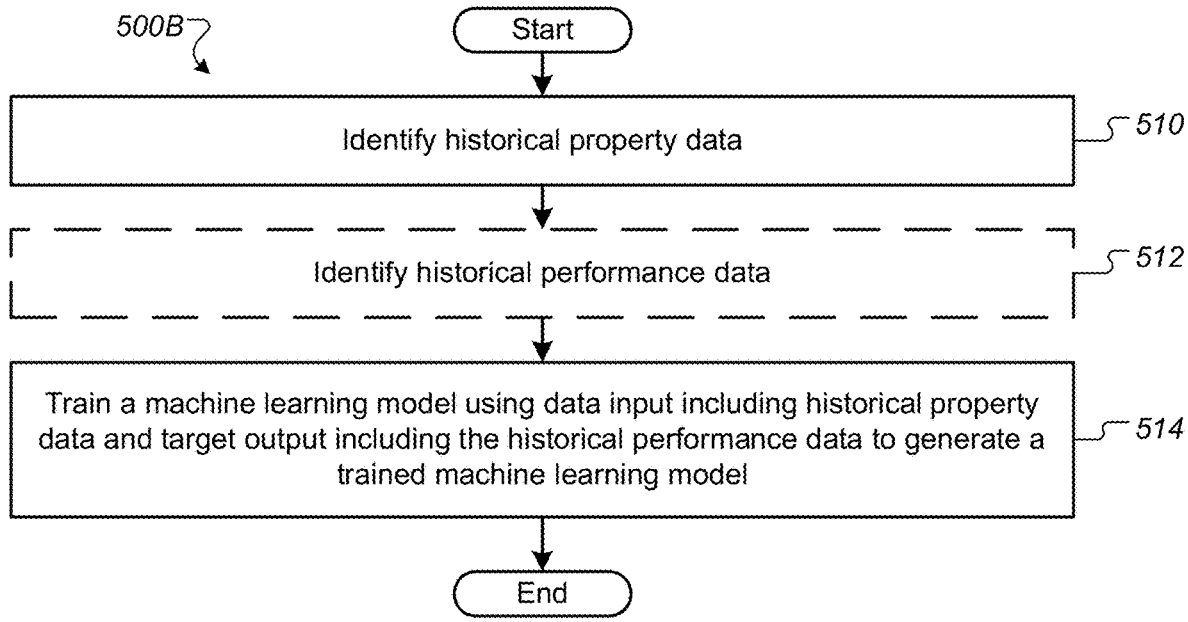
Figure 5C:
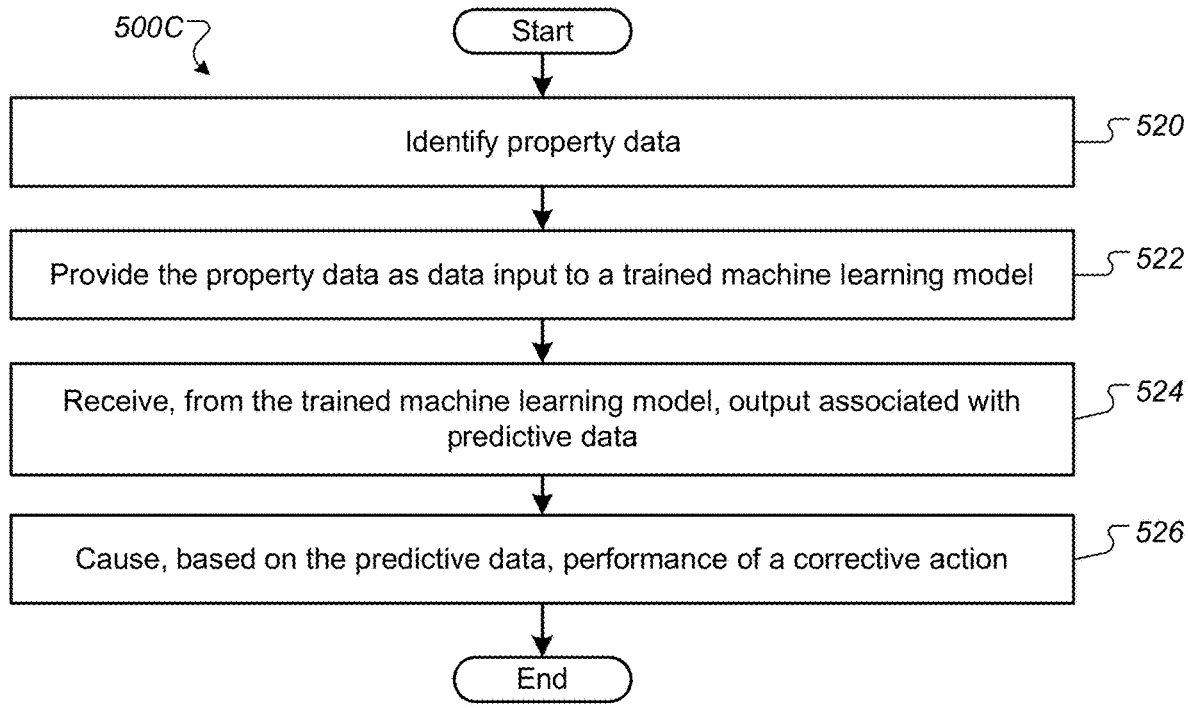

FIGS. 5A-C are flow diagrams of methods 500A-C associated with defect analysis, according to certain embodiments. In some embodiments, methods 500A-C are performed by processing logic that includes hardware (e.g., circuitry, dedicated logic, programmable logic, microcode, processing device, etc.), software (such as instructions run on a processing device, a general-purpose computer system, or a dedicated machine), firmware, microcode, or a combination thereof. In some embodiments, methods 500A-C are performed, at least in part, by predictive system 110. In some embodiments, method 500A is performed by client device 120 (e.g., corrective action component 122) and/or predictive system 110 (e.g., predictive component). In some embodiments, method 500B is performed by server machine 180 (e.g., training engine 182, etc.). In some embodiments, method 500C is performed by predictive server 112 (e.g., predictive component 114) and/or client device 120 (e.g., corrective action component 122). In some embodiments, a non-transitory storage medium stores instructions that when executed by a processing device (e.g., of predictive system 110, of server machine 180, of predictive server 112, of client device 120, etc.), cause the processing device to perform one or more of methods 500A-C.

For simplicity of explanation, methods 500A-C are depicted and described as a series of operations. However, operations in accordance with this disclosure can occur in various orders and/or concurrently and with other operations not presented and described herein. Furthermore, in some embodiments, not all illustrated operations are performed to implement methods 500A-C in accordance with the disclosed subject matter. In addition, those skilled in the art will understand and appreciate that methods 500A-C could alternatively be represented as a series of interrelated states via a state diagram or events.

FIG. 5A is a flow diagram of a method 500A for defect analysis (e.g., defect source tracing and defect root cause identification), according to certain embodiments.

Referring to FIG. 5A, in some embodiments, at block 502 the processing logic implementing the method 500A identifies property data (e.g., property data 142 of FIG. 1) of a substrate processed by a substrate processing system (e.g., manufacturing equipment 124 of FIG. 1). The substrate may be a wafer, semiconductor, display, etc.

In some embodiments, the property data can be at least one of SEM images, EDX images, or the like. In some embodiments, the property data can be at least one of morphology data, size attribute data, dimensional attribute data, defect distribution data, spatial location data, elemental analysis data, wafer signature data, chip layer, chip layout data, edge data, defect metadata including but not limited to grey level data and signal to noise data, or the like.

The property data may be captured via metrology equipment after one or more substrate processing operations.

The property data may be captured via sensors after one or more substrate processing operations.

At block 504, processing logic identifies, based on a first subset of the property data, regions of the substrate corresponding to a first defect category. In some embodiments, the first subset of property data 142 can be at least one of SEM images, EDX images, morphology data, size attribute data, dimensional attribute data, defect distribution data, spatial location data, elemental analysis data, wafer signature data, chip layer, chip layout data, edge data, defect metadata including but not limited to grey level data and signal to noise data, or the like. In some embodiments, the first subset of property data 142 can be at least one of SEM images, EDX images, or the like. A defect category can include one or more of line breaks, non-fills, bridges, stains, scratches, glass damage, foreign material (particles), residue, resist collapse, via stress, cavities, pits, crystal defects, cracks, and/or the like.

At block 506, processing logic sub-categorizes, based on a second subset of the property data, the regions of the substrate corresponding to the first defect category into defect sub-categories. A defect sub-category can include one or more of sphere particles, random particles, rod-like particles, flake particles, post imprint fall-on particles, ring pits, micro pits, macro pits, mouse bites, multi-line bridging, CMP bridging, photo resist bridging, micro bridging, organic stains, inorganic stains, lithography pinching, step bunching, stacking faults, shallow triangles, obtuse triangles, surface triangles, down falls, ticks, chatter marks, crescents, micropipes, PL circles, basal plane dislocations, juts, hillocks, and/or the like.

In some embodiments, the processing logic may perform one or more of blocks 502-508 using a machine learning model (e.g., see FIGS. 5B-C).

At block 508, processing logic causes, based on at least one of the defect sub-categories, performance of a corrective action associated with the substrate processing system. In some embodiments, block 508 includes determining a defect root cause based on the at least one of the plurality of defect sub-categories, the corrective action corresponding to the defect root cause. For example, a corrective action that corresponds to the defect root cause may be a corrective action that corrects aspects of a certain subset of manufacturing equipment that caused the defect. Tracing a root cause may be to determine a defect is caused by a certain subset of manufacturing equipment based on property data of a substrate. In some embodiments, the defect root cause may be a specific part of the substrate processing equipment (e.g., manufacturing equipment 124 of FIG. 1).

In some embodiments, block 508 includes determining a defect source based on the at least one of the plurality of defect sub-categories (e.g., the corrective action corresponds to the defect source). For example, a corrective action corresponds to a defect source when execution of the corrective action stops further defects originating at the defect source. In one example, a corrective action may be replacing a component of the manufacturing equipment that caused the defect. In some embodiments the defect source may be identified using defect source tracing. Defect source tracing may be determining the source of a defect based on a defect(s) property data. In some embodiments, the defect source may be a component of the substrate processing equipment (e.g., manufacturing equipment 124 of FIG. 1) that is to be cleaned, repaired, and/or replaced.

In some embodiments, the corrective action includes providing an alert, causing a cleaning action, causing a repairing action, causing replacement of a component, shutting down one or more portions of the substrate processing equipment, determining a predicted end of life of a component of the substrate processing equipment, etc. In some embodiments, the corrective action component 122 of FIG. 1 receives an indication of a corrective action (e.g., based on predictive data 160) from the predictive system 110 and causes performance of the corrective action.

In some embodiments, the processing logic further determines that the at least one of the defect sub-categories corresponds to a defect evolution associated with the performance of the corrective action. In some embodiments, defect evolution may be information about a defect at multiple operations (e.g., layers) in the manufacturing process of a substrate. Defect evolution may follow a defect from layer to layer and documents (e.g., property data) the changes to the defect. Defect translation uses defect evolution information to follow a defect from layer to layer. In some embodiments, the determining is based on defect evolution information of at least one of the defect sub-categories. In some embodiments, defect evolution information may be property data 142 of a substrate (e.g., historical property data 144, current property data 146) that shows the same coordinate in various layers of a substrate (e.g., there is a defect or abnormality in at least one of the layers at the coordinate). In some embodiments, the kill ratio associated with the at least one of the plurality of defect sub-categories may be determined using defect evolution data. In some embodiments, kill ratio may be the proportion of defects estimated to cause substrate failure (e.g., die failure on a substrate). For example, a defect found on a certain number of dies causes a certain number of those dies to fail. The ratio of the number of dies with the defect to the number of those dies that failed may be the kill ratio of such a defect. In some embodiments, the corrective action associated with the substrate processing system may be performed or not based on defect evolution information and/or and associated kill ratio.

In some embodiments, the processing logic further identifies a first subset of the defect sub-categories (e.g., including the at least one of the defect sub-categories corresponding to the corrective action). The first subset of the defect sub-categories corresponds to substrate property data that meets a threshold level (e.g., thickness that meets a threshold thickness, conductivity that meets a threshold conductivity, etc.). In some embodiments, the threshold level may correspond to property data (e.g., SEM images, EDX images, morphology data, size attribute data, dimensional attribute data, defect distribution data, spatial location data, elemental analysis data, wafer signature data, chip layer, chip layout data, edge data, or defect metadata including but not limited to grey level data and signal to noise data, and/or the like) or performance data (e.g., values of one or more of image data, morphology data, size attribute data, dimensional attribute data temperature, spacing, electrical current, power, voltage, and/or the like).

In some embodiments, the identifying of the first subset of the defect sub-categories is based one or more of user input (e.g., user input 444 of FIG. 4C) indicative of one or more sub-categories of interest or predictive data associated with output received from a trained machine learning model based on data input including historical defect sub-categories and/or target output including historical property data.

In some embodiments, the processing logic further provides the first subset of the property data as input to a trained machine learning model. The processing logic obtains, from the trained machine learning model, output associated with predictive data. The identifying of the regions of the substrate corresponding to the first defect category is based on the predictive data.

In some embodiments, the processing logic further provides the second subset of the property data as input to a trained machine learning model. The processing logic further obtains, from the trained machine learning model, output associated with predictive data. The sub-categorizing of the plurality of regions into the defect sub-categories is based on the predictive data.

In some embodiments, the defect source and/or the defect root cause may be formed during a prior operation in a substrate manufacturing process. In some embodiments, the prior operation in a substrate manufacturing process may correlate to a prior layer or the same layer in the substrate manufacturing process. In some embodiments, the prior operation may be one of wet cleans, surface passivation, photolithography, ion implantation, etching, dry etching, reactive-ion etching (RIE), deep reactive-ion etching, atomic layer etching (ALE), wet etching, buffered oxide etching, plasma ashing, thermal treatments, rapid thermal annealing, furnace annealing, thermal oxidation, chemical vapor deposition (CVD), atomic layer deposition (ALD), physical vapor deposition (PVD), molecular beam epitaxy (MBE), laser lift-off, electrochemical deposition (ECD), chemical-mechanical polishing (CMP), wafer testing, die preparation, through-silicon via manufacture, wafer mounting, wafer backgrinding and polishing, wafer bonding and stacking, redistribution layer manufacture, wafer bumping, die cutting or wafer dicing, IC packaging, die attachment, molding, baking, electroplating, laser marking or silkscreen printing, IC testing and/or the like.

In some embodiments, the defect source or the defect root cause may originate from a prior layer in a substrate manufacturing process. In some embodiments, the prior layer may correspond to a prior operation in a substrate manufacturing process. For example, in some embodiments, a defect may originate in operation 1 of substrate 401. Property data (e.g., property data 142, historical property data 144) may be identified following operation n of substrate 403. The defect source or defect root cause may be identified based on property data 400F of substrate 403 and a defect evolution entry of a defect evolution database. In further embodiments, a processing device may cause a corrective action based on the defect source or defect root cause identified based the defect evolution entry of the defect evolution database.

FIG. 5B is a method for training a machine learning model (e.g., model 190 of FIG. 1) for determining predictive data (e.g., predictive data 160 of FIG. 1) for defect source tracing and defect root cause identification.

Referring to FIG. 5B, at block 510 of method 500B, the processing logic identifies historical property data of substrates (e.g., historical property data 144 of FIG. 1, historical input property data). Historical property data may include data from historic substrates such as image data, SEM images, EDX images, morphology data, size attribute data, dimensional attribute data, defect distribution data, spatial location data, elemental analysis data, wafer signature data, chip layer, chip layout data, edge data, or defect metadata including but not limited to grey level data and signal to noise data, temperature, spacing, electrical current, power, voltage, and/or the like.

In some embodiments, at block 512, the processing logic identifies historical performance data (e.g., historical performance data 154 of FIG. 1) of the substrates. Historical performance data may include data from historical substrate such as values of one or more of image data, morphology data, size attribute data, dimensional attribute data, temperature, spacing, electrical current, power, voltage, and/or the like). Performance data, including historical performance data, may include metrology data or user input that indicates the performance of a substrate in conforming to certain parameters or achieving certain levels of performance (e.g., ability to pass probe tests measuring voltage). At least a portion of the historical property data and the historical performance data may be associated with new substrate processing equipment parts (e.g., used for benchmarking). At least a portion of the historical property data and the historical performance data may be associated with manufactured substrates.

At block 514, the processing logic trains a machine learning model using data input including historical property data 144 and/or target output including the historical performance data 154 to generate a trained machine learning model.

In some embodiments, the historical property data is of historical substrates and/or the historical performance data corresponds to the historical substrates. In some embodiments, the historical property data includes historical images of historical substrates and/or the historical performance data corresponds to the historical substrates. The historical performance data may be associated with substrate quality, such as metrology data of substrates, substrate throughput, substrate defects, etc. The historical performance data may be associated with quality of a substrate processing equipment part, such as test data, metrology data of the substrates, time of failure of substrates, etc.

At block 514, the machine learning model may be trained using data input including the historical property data and/or target output including the historical performance data to generate a trained machine learning model configured to identify a source or root cause of an identified defect based on property data (e.g., property data of block 502 of FIG. 5A). At block 508 of FIG. 5A, processing logic may use the source or root cause identified via the trained machine learning model to cause performance of a corrective action associated with the substrate processing system.

In some embodiments, the historical property data of block 510 is of historical substrates and the historical performance data of block 512 corresponds to the historical substrates.

At block 514, the machine learning model may be trained using data input including the historical property data 144 and target output including the historical performance data 156 to generate a trained machine learning model configured to predict performance data 152 (e.g., performance data of the substrate, predictive data 160) based on property data 144 (e.g., property data of block 502 of FIG. 5A). Responsive to the predicted performance data meeting a first threshold (e.g., threshold kill ratio for defect of interest (DOI)) the processing logic may cause a corrective action (e.g., shutdown, clean, repair, replace a substrate processing equipment part, or the like). Responsive to the predicted performance data meeting a second threshold (e.g., kill ratio for DOI), the processing logic may cause the substrate processing equipment part to be used in the substrate processing system.

In some embodiments, the historical property data 144 of block 510 includes historical property data 144 of historical substrates and the historical performance data 156 of block 512 includes historical performance data 156 of historical substrates.

At block 514, the machine learning model may be trained using data input including the historical property data 144 and target output including the historical performance data 156 to generate a trained machine learning model configured to predict performance data 152 (e.g., performance data of the substrate processing equipment part) based on a property data 144 (e.g., property data of blocks 502 and 504 of FIG. 5A). Responsive to the predicted performance data meeting a first threshold, the processing logic may cause a corrective action (e.g., shutdown, clean, repair, or replace a substrate processing equipment part). Responsive to the predicted performance data meeting a second threshold, the processing logic may cause the substrate processing equipment part to be used in the substrate processing system.

FIG. 5C is a method 500C for using a trained machine learning model (e.g., model 190 of FIG. 1) for defect analysis to cause performance of a corrective action.

Referring to FIG. 5C, at block 520 of method 500C, the processing logic identifies property data 144. In some embodiments, the property data 144 of block 510 includes an image of a substrate.

At block 522, the processing logic provides the property data 144 as data input to a trained machine learning model (e.g., trained via block 514 of FIG. 5B).

At block 524, the processing logic receives, from the trained machine learning model, output associated with predictive data.

At block 526, the processing logic causes, based on the predictive data 160, performance of a corrective action.

In some embodiments, the property data 144 is an image of a substrate and the trained machine learning model of block 522 was trained using data input including historical images of substrates and target output including historical performance data 154 (e.g., substrate quality using historical substrate processing equipment parts).

In some embodiments, the property data 144 is an image of a substrate and the trained machine learning model of block 522 was trained using data input including historical images of substrates and target output including historical performance data 154 that includes historical property data 144 of defects corresponding to the historical substrates. The predictive data 160 of block 524 may be associated with predicted performance data (e.g., performance data of the substrate) based on the image. Responsive to the predicted performance data meeting a first threshold (e.g., kill ratio), the processing logic may cause a corrective action (e.g., shutdown, clean, repair, or replace a substrate processing equipment part). Responsive to the predicted performance data meeting a second threshold (e.g., kill rate), the processing logic may cause a substrate processing equipment part to be used in the substrate processing system.

In some embodiments, block 502 of FIG. 5A includes training a machine learning model to identify property data of a substrate processed by a substrate processing system and using the trained machine learning model to identify property data of a substrate processed by a substrate processing system.

In some embodiments, block 504 of FIG. 5A includes training a machine learning model to identify, based on a first subset of the property data, a plurality of regions of the substrate corresponding to a first defect category and using the trained machine learning model to identify, based on a first subset of the property data, a plurality of regions of the substrate corresponding to a first defect category.

In some embodiments, block 506 of FIG. 5A includes training a machine learning model to sub-categorize, based on a second subset of the property data, the plurality of regions of the substrate corresponding to the first defect category into a plurality of defect sub-categories and using the trained machine learning model to sub-categorize, based on a second subset of the property data, the plurality of regions of the substrate corresponding to the first defect category into a plurality of defect sub-categories.

In some embodiments, block 508 of FIG. 5A includes training a machine learning model to cause, based on at least one of the plurality of defect sub-categories, performance of a corrective action associated with the substrate processing system and using the trained machine learning model to cause, based on at least one of the plurality of defect sub-categories, performance of a corrective action associated with the substrate processing system.

In some embodiments, the processing logic trains a machine learning model to identify subcategories of interest and uses the trained machine learning model to identify subcategories of interest.

Figure 6:
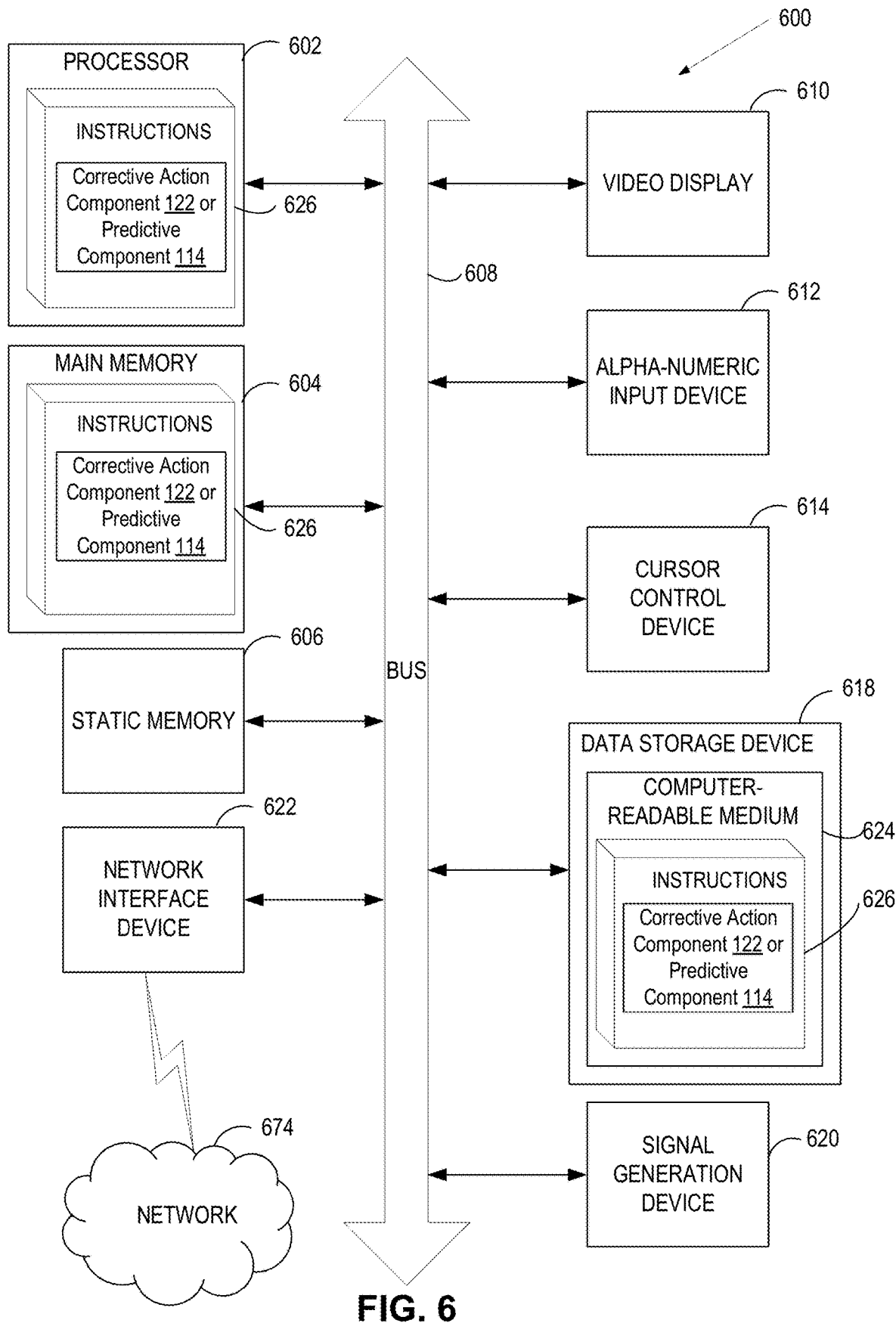
FIG. 6 is a block diagram illustrating a computer system, according to certain embodiments.

FIG. 6 is a block diagram illustrating a computer system 600, according to certain embodiments. In some embodiments, the computer system 600 is one or more of client device 120, predictive system 110, server machine 170, server machine 180, predictive server 112, and/or the like.

In some embodiments, computer system 600 is connected (e.g., via a network, such as a Local Area Network (LAN), an intranet, an extranet, or the Internet) to other computer systems. In some embodiments, computer system 600 operates in the capacity of a server or a client computer in a client-server environment, or as a peer computer in a peer-to-peer or distributed network environment. In some embodiments, computer system 600 is provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 includes a processing device 602, a volatile memory 604 (e.g., Random Access Memory (RAM)), a non-volatile memory 606 (e.g., Read-Only Memory (ROM) or Electrically-Erasable Programmable ROM (EEPROM)), and a data storage device 618, which communicate with each other via a bus 608.

In some embodiments, processing device 602 is provided by one or more processors such as a general purpose processor (such as, for example, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), or a network processor).

In some embodiments, computer system 600 further includes a network interface device 622 (e.g., coupled to network 674). In some embodiments, computer system 600 also includes a video display unit 610 (e.g., an LCD), an alphanumeric input device 612 (e.g., a keyboard), a cursor control device 614 (e.g., a mouse), and a signal generation device 620.

In some implementations, data storage device 618 includes a non-transitory computer-readable storage medium 624 on which store instructions 626 encoding any one or more of the methods or functions described herein, including instructions encoding components of FIG. 1 (e.g., corrective action component 122, predictive component 114, etc.) and for implementing methods described herein (e.g., one or more of methods 500A-C).

In some embodiments, instructions 626 also reside, completely or partially, within volatile memory 604 and/or within processing device 602 during execution thereof by computer system 600, hence, in some embodiments, volatile memory 604 and processing device 602 also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

In some embodiments, the methods, components, and features described herein are implemented by discrete hardware components or are integrated in the functionality of other hardware components such as ASICS, FPGAs, DSPs or similar devices. In some embodiments, the methods, components, and features are implemented by firmware modules or functional circuitry within hardware devices. In some embodiments, the methods, components, and features are implemented in any combination of hardware devices and computer program components, or in computer programs.

Unless specifically stated otherwise, terms such as "identifying," "sub-categorizing," "causing," "providing," "obtaining," "determining," "masking," "resizing," "performing," "converting," "applying," "associating," "comparing," "training," "receiving," "updating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. In some embodiments, the terms "first," "second," "third," "fourth," etc. as used herein are meant as labels to distinguish among different elements and do not have an ordinal meaning according to their numerical designation.

Examples described herein also relate to an apparatus for performing the methods described herein. In some embodiments, this apparatus is specially constructed for performing the methods described herein, or includes a general-purpose computer system selectively programmed by a computer program stored in the computer system. Such a computer program is stored in a computer-readable tangible storage medium.

The methods and illustrative examples described herein are not inherently related to any particular computer or other apparatus. In some embodiments, various general-purpose systems are used in accordance with the teachings described herein. In some embodiments, a more specialized apparatus is constructed to perform methods described herein and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    identifying, by a processing device, property data of a substrate processed by a substrate processing system;
    identifying, by the processing device based on a first subset of the property data, a plurality of regions of the substrate corresponding to a first defect category;
    sub-categorizing, by the processing device based on a second subset of the property data, the plurality of regions of the substrate corresponding to the first defect category into a plurality of defect sub-categories;
    determining, by the processing device, a defect source associated with one or more of the plurality of regions corresponding to the plurality of defect sub-categories; and
    responsive to the determining of the defect source, causing, by the processing device, performance of a corrective action associated with the substrate processing system to reduce substrate defects.

2. The method of claim 1, wherein the first subset of the property data comprises at least one of scanning electron microscope (SEM) images or energy dispersive x-ray microanalysis (EDX) images.

3. The method of claim 1, wherein the second subset of the property data comprises at least one of morphology data, size attribute data, dimensional attribute data, defect distribution data, spatial location data, elemental analysis data, wafer signature data, chip layer, chip layout data, edge data, or defect metadata.

4. The method of claim 1 further comprising:
providing the first subset of the property data as input to a trained machine learning model; and
obtaining, from the trained machine learning model, output associated with predictive data, wherein the identifying of the plurality of regions of the substrate corresponding to the first defect category is based on the predictive data.

5. The method of claim 1 further comprising:
providing the second subset of the property data as input to a trained machine learning model; and
obtaining, from the trained machine learning model, output associated with predictive data, wherein the sub-categorizing of the plurality of regions into the plurality of defect sub-categories is based on the predictive data.

6. The method of claim 1 further comprising,
determining a defect root cause based on the at least one of the plurality of defect sub-categories, the corrective action corresponding to the defect root cause.

7. The method of claim 6, wherein at least one of the defect source or the defect root cause is associated with a component of the substrate processing system associated with a prior operation of a substrate manufacturing process.

8. The method of claim 6, wherein at least one of the defect source or the defect root cause associated with a component of the substrate processing system associated with a prior layer provided by a substrate manufacturing process.

9. The method of claim 1 further comprising:
identifying a first subset of the plurality of defect sub-categories comprising the at least one of the plurality of defect sub-categories, wherein the first subset of the plurality of defect sub-categories corresponds to substrate property data that meets a threshold level.

10. The method of claim 9, wherein the identifying of the first subset of the plurality of defect sub-categories is based on one or more of:
user input indicative of one or more sub-categories of interest; or
predictive data associated with output received from a trained machine learning model based on data input comprising historical defect sub-categories and target output comprising historical property data.

11. The method of claim 1 further comprising determining that the at least one of the plurality of defect sub-categories corresponds to a defect evolution associated with the performance of the corrective action.

12. A non-transitory computer-readable storage medium storing instructions which, when executed, cause a processing device to perform operations comprising:
identifying property data of a substrate processed by a substrate processing system;
identifying, based on a first subset of the property data, a plurality of regions of the substrate corresponding to a first defect category;
sub-categorizing, based on a second subset of the property data, the plurality of regions of the substrate corresponding to the first defect category into a plurality of defect sub-categories;
determining a defect source associated with one or more of the plurality of regions corresponding to the plurality of defect sub-categories; and
responsive to the determining of the defect source, causing, performance of a corrective action associated with the substrate processing system to reduce substrate defects.

13. The non-transitory computer-readable storage medium of claim 12, the operations further comprising:
providing the first subset of the property data as input to a trained machine learning model; and
obtaining, from the trained machine learning model, output associated with predictive data, wherein the identifying of the plurality of regions of the substrate corresponding to the first defect category is based on the predictive data.

14. The non-transitory computer-readable storage medium of claim 12, the operations further comprising:
providing the second subset of the property data as input to a trained machine learning model; and
obtaining, from the trained machine learning model, output associated with predictive data, wherein the sub-categorizing of the plurality of regions into the plurality of defect sub-categories is based on the predictive data.

15. The non-transitory computer-readable storage medium of claim 12, wherein the operations further comprise
determining a defect root cause based on the at least one of the plurality of defect sub-categories, the corrective action corresponding to the defect root cause.

16. The non-transitory computer-readable storage medium of claim 12, wherein the operations further comprise:
identifying a first subset of the plurality of defect sub-categories comprising the at least one of the plurality of defect sub-categories, wherein the first subset of the plurality of defect sub-categories corresponds to substrate property data that meets a threshold level.

17. The non-transitory computer-readable storage medium of claim 16, wherein the identifying of the first subset of the plurality of defect sub-categories is based one or more of:
user input indicative of one or more sub-categories of interest; or
predictive data associated with output received from a trained machine learning model based on data input comprising historical defect sub-categories and target output comprising historical property data.

18. A system comprising:
a memory; and
a processing device coupled to the memory, the processing device to:
identify property data of a substrate processed by a substrate processing system;
identify, based on a first subset of the property data, a plurality of regions of the substrate corresponding to a first defect category;
sub-categorize, based on a second subset of the property data, the plurality of regions of the substrate corresponding to the first defect category into a plurality of defect sub-categories;
determine a defect source associated with one or more of the plurality of regions corresponding to the plurality of defect sub-categories; and
responsive to determining the defect source, cause performance of a corrective action associated with the substrate processing system to reduce substrate defects.

19. The system of claim 18, wherein the processing device is further to:
provide the first subset of the property data as input to a trained machine learning model; and
obtain, from the trained machine learning model, output associated with predictive data, wherein the processing device is to identify the plurality of regions of the substrate corresponding to the first defect category based on the predictive data.

20. The system of claim 18, wherein the processing device is further to identify the first subset of the plurality of defect sub-categories based on one or more of:
- user input indicative of one or more sub-categories of interest; or
- predictive data associated with output received from a trained machine learning model based on data input comprising historical defect sub-categories and target output comprising historical property data.

* * * * *